(12) United States Patent
Ascenzi et al.

(10) Patent No.: US 7,127,383 B2
(45) Date of Patent: Oct. 24, 2006

(54) MODELING VISCOELASTIC TORSIONAL PROPERTIES OF OSTEONS

(76) Inventors: Maria-Grazia Ascenzi, 1713 Bryn Mawr Ave., Los Angeles, CA (US) 90405; John Michael Kabo, 17048 Jeanine Pl., Grenada Hills, CA (US) 91344

( * ) Notice: Subject to any disclaimer, the term of this patent is extended or adjusted under 35 U.S.C. 154(b) by 421 days.

(21) Appl. No.: 10/066,293

(22) Filed: Jan. 31, 2002

(65) Prior Publication Data
US 2002/0155162 A1 Oct. 24, 2002

Related U.S. Application Data

(63) Continuation-in-part of application No. 09/981,684, filed on Oct. 17, 2001.

(60) Provisional application No. 60/336,063, filed on Oct. 31, 2001, provisional application No. 60/265,472, filed on Jan. 31, 2001.

(51) Int. Cl.
*G06F 9/455* (2006.01)
(52) U.S. Cl. .................. 703/11; 600/449; 600/586; 623/23.51; 623/23.56
(58) Field of Classification Search .............. 703/11, 703/2; 600/36, 449, 586; 514/12; 623/23.61, 623/23.51, 23.56; 29/896.6; 424/49, 9.2; 382/128
See application file for complete search history.

(56) References Cited

U.S. PATENT DOCUMENTS

| | | | |
|---|---|---|---|
| 5,732,469 A * | 3/1998 | Hamamoto et al. ........ 29/896.6 |
| 5,947,893 A * | 9/1999 | Agrawal et al. .............. 600/36 |
| 6,213,958 B1 | 4/2001 | Winder | |
| 6,293,970 B1 * | 9/2001 | Wolfinbarger, Jr. et al. ....................... 623/23.61 |
| 6,333,313 B1 * | 12/2001 | Copland, III et al. ......... 514/12 |
| 6,416,737 B1 | 7/2002 | Manolagas et al. | |
| 6,442,287 B1 | 8/2002 | Jiang et al. | |

OTHER PUBLICATIONS

R. Lakes, "Materials with structural hierarchy", Nature 361, Feb. 1993).*
Amprino, R. and Engström, A. (1952) Studies on X-ray absorption and diffraction of bone tissue. Acta Anat, 15, 1-22.
Ascenzi, M.-G. (2000) National Science Foundation grant description.
Ascenzi, M.-G.. Benvenuti, A., and Ascenzi, A. (2000) Single osteon micromechanical testing. In: Mechanical testing of bone (An Y. and Draughn R. eds), CRC Press, Boca Raton, Florida.
Ascenzi, M.-G. (1999a) Evidence of macroscopic prestress in human femoral shaft, Abstracts of the XVIIth conference of the International Society of Biomechanics, Calgary.
Ascenzi, M.-G. (1999b) A first estimation of prestress in so-called circularly fibered osteonic lamellae, J. Biomech., 32, 935.
Ascenzi, M.-G. (1998a) A first estimate of prestress in so-called circularly fibered osteonic lamellae, Abstracts of the 11th conference of the European Society of Biomechanics, J. Biomech., 31, Suppl. 1, 22.

(Continued)

*Primary Examiner*—Paul L. Rodriguez
*Assistant Examiner*—Kandasamy Thangavelu
(74) *Attorney, Agent, or Firm*—Darby & Darby

(57) ABSTRACT

The present invention provides a geometric/material computer model of hierarchical bone based upon the viscoelastic properties of longitudinal and alternate osteons. The viscoelastic properties of osteons include, for example, mechanical properties and osteon content of various components such as collagen, mucopolysacharides, hydroxyapatite, osteocytes and osteoblasts. The invention also provides a method for preparing such a model.

37 Claims, 13 Drawing Sheets
(10 of 13 Drawing Sheet(s) Filed in Color)

OTHER PUBLICATIONS

Ascenzi, A., Benvenuti, A., Bigi, A., Foresti, E., Koch, M.H.J., Mango, F., Ripamonti, A., and Roveri, N. (1998) X-ray diffraction on cyclically loaded osteons. Calc. Tissue Int., 62:266-273.

Ascenzi, A., Ascenzi M. G., Benvenuti, A., and Mango, F. (1997) Pinching in longitudinal and alternate osteons during cyclic loading. J. Biomechanics, 30, 689-695.

Ascenzi, A., Baschieri P., and Benvenuti, A. (1994) The torsional properties of single selected osteons. J. Biomech., 27, 875-884.

Ascenzi, A., Baschieri P., and Benvenuti, A. (1990) The bending properties of single osteons. J. Biomech., 23, 763-771.

Ascenzi, A. (1988) The micromechanics versus the macromechanics of cortical bone-A comprehensive presentation. J. Biomech. Eng., 110, 357-363.

Ascenzi, A., Boyde, A., Portigliatti-Barbos, M. and Carando, S. (1987a) Micro-biomechanics vs Macrobiomechanics in cortical bone. A micromechanical investigation of femurs deformed by bending. J. Biomech., 20, 1045-1053.

Ascenzi, A., Benvenuti, A., Mango, F. and Simili, R. (1985) Mechanical hysteresis loops from single osteons: Technical devices and preliminary results, J. Biomech., 18, 391-398.

Ascenzi, A. and Bonucci, E. (1972) The shearing properties of single osteons. Anat. Rec., 172, 499-510.

Ascenzi, A. and Bonucci, E. (1968) The compressive properties of single osteons. Anat. Rec., 161, 377-392.

Ascenzi, A. and Bonucci, E. (1967) The tensile properties of single osteons. Anat. Rec., 158, 375-386.

Boyde, A., Bianco, P., Portigliatti-Barbos, M. and Ascenzi, A. (1984) Collagen Orientation in compact bone: 1. A new method for the determination of the proportion of collagen parallel to the plane of compact bone sections, Metab. Bone Dis. & Rel. Res., 5, 299-307.

Carter, D.R., Caler, W.E., Spengler, D. M., and Frankel, V. H. (1981), Fatigue behavior of adult cortical bone: The influence of mean strin and strain range., Acta Orthop. Scand., 52, 481-490.

Cook, J. and Gordon, J. E. (1964) A mechanism for the control of crack propagation in all brittle systems. Proc. R. Soc. Lond., Ser. A, 282, 508-520.

Crolet J.-M., Aoubiza, B. and Meunier, A. (1993) Compact bone: numerical simulation of mechanical characteristics. J. Biomech., 26, 677-687.

Currey, J.D. (1959) Differences in tensile strength of bone of different hystological types. J. Anat., 93, 87-95.

Evans, F.G. and Vincentelli, R. (1969) Relation of collagen fiber orientation to some mechanical properties of human cortical bone. J. Biomech., 2, 63-71.

Frasca, P., Harper, R. and Katz, J. (1981) Strain and frequency dependence of shear storage modulus for human single osteons and cortical bone microsamples-size and hydration effects. J. Biomech, 14, 679-690.

Frasca, P., Harper, R. and Katz, J. (1977) Collagen fiber orientation in human secondary osteons. Acta Anat., 98, 1-13.

Giraud-Guille, M. M. (1988) Twisted plywood architecture of collagen fibrils in human compact bone osteons. Calc. Tissue Int., 42, 167-180.

Gupta, V., and Bergström, J.S. (1998) Compressive failure of rocks by shear faulting. J. of Geoph. Res. 103, 23, 875-23,895.

Hert J., Fiala P. and Petrtyl M. (1994) Osteon orientation of the diaphysis of the long bones in man. Bone, 15, 269-277.

Huja, S.S., Hasan, M.S., Pidaparti, R., Turner, C.H., Garetto, L.P. and Burr, D. (1999) Development of a fluorescent light technique for evaluating microdamage in done subjected to fatigue loading. J. Biomech., 32, 1243-1249.

Jepsen, K. J., Davy, D.T. and Krzypow, D. J. (1999) The role of the lamellar interface during torsional yielding of human cortical bone. J. Biomech., 32, 303-310.

Katz, J. L. and Meunier, A. (1987) The elastic anisotropy of bone. J. Biomech., 20, 1063-1070.

Katz, J. L. and Ukraincik, K. (1971) On the anisotropic elastic properties of hydroxyapatite. J. Biomech., 4, 221-227.

Lakes, R. (1995) On the torsional properties of single osteons, J. Biomech., 28, 1409-1410.

Martens, M., van Audekercke, R., de Meester, P. and Mulier, J. (1980) The mechanical characteristics of the long bones of the lower extremity in torsional loading. J. Biomech., 13, 667-676.

Pidaparti, R. and Burr D. (1992) Collagen fiber orientation and geometry effects on the mechanical properties of secondary osteons. J. Biomech., 25, 869-880.

Piekarski, K. (1970) Fracture of bone. J. Appl. Physics, 41, 215-223.

Portigliatti-Barbos, M., Bianco, P. and Ascenzi, A. (1983) Distribution of osteonic and interstitial components in the human femoral shaft with reference to structure, calcification, and mechanical properties. Acta Anat., 115, 178-186.

Portigliatti-Barbos, M., Bianco, P., Ascenzi, A. and Boyde, A. (1984) Collagen orientation in compact bone: II. Distribution of lamellae in the whole of the human femoral shaft with reference to its mechanical properties. Metab. Bone Dis. & Rel. Res., 5, 309-315.

Portigliatti-Barbos, M., Carando, S., Ascenzi, A. and Boyde, A. (1987) On the structural symmetry of human femurs, Bone, 8, 165-169.

Rho, J.Y., Zioupos, P., Currey, J.D., and Pharr ,G. M. (1999) Variations in the individual thick lamellar properties within osteons by nanoindentation, Bone, 25, 295-300.

Sasaki N. (2000) Viscoelastic properties of bone and testing methods. In: Mechanical testing of bone (An Y. and Draughn R. eds), CRC Press, Boca Raton, Florida.

Simkin, A., and Robin,G. (1974) Fracture formation in differing collagen fiber pattern of compact bone. J. Biomech., 7, 183-188.

Vincentelli, R. and Evans, F. G. (1971) Relations among mechanical properties, collagen fibers, and calcification in adult human cortical bone. J. Biomech., 4, 193-201.

Ascenzi, A., et al., (1987b) Distribution of Lamellae in Human Femoral Shafts Deformed by Bending with Interferences on Mechanical Properties. Bone, 8:319-325.

Ascenzi, A., and Benvenuti, A., (1980) Evidence of a state of initial stress in osteonic lamellae. Acta Orthop. Belg., 46:580-583.

Carando, S., et al., (1991) Macroscopic shape of, and lamellar distribution within, the upper limb shafts, allowing interferences about mechanical properties. Bone, 12:265-269.

Carando, S., (1989) Orientation of collagen in human tibial and fibular shaft and possible correlation with mechanical properties. Bone, 10:139-142.

Currey, J.D. (1969) The relationship between the stiffness arid the mineral content of bone. J. Biomechanics, 2:477-480.

Marotti, G., et al., (1994) Structure and function of lamellar bone. Clinical Rheumatology, 13(1):63-68.

Kotha et al., "*Tensile damage and its effects on cortical bone*", Journal of Biomechanics, 36 (2003) 1683-1689.

Kotha et al., "*Modeling the Tensile Mechanical Behavior of Bone along the Longitudinal Direction*", J. theor. Biol. (2002) 219, 269-279.

Biophysical Journal, vol. 79, Oct. 2000, 1737-1746, Ingomar Jager and Peter Fratzi, "Mineralized Collagen Fibrils: A Mechanical Model with a Staggered Arrangement of Mineral Particles".

Journal of Materials Science: 33 (1998) 1497-1509, U. Akiva, H.D. Wagner, and S. Weiner, "Modelling the Three-Dimensional Elastic Constants of Parallel-Fibred and Lamellar Bone".

* cited by examiner

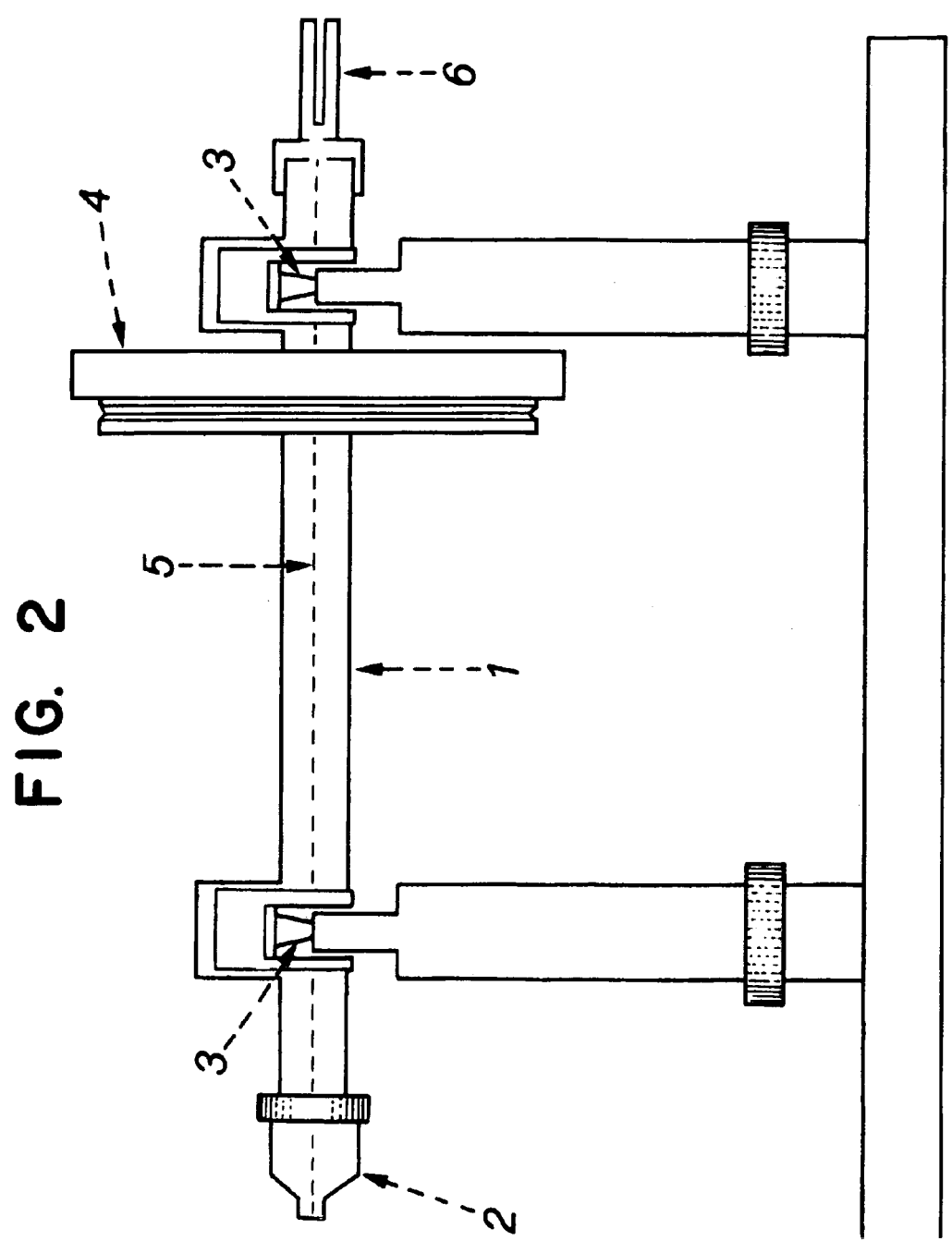

FIG. 7A
FIG. 7B
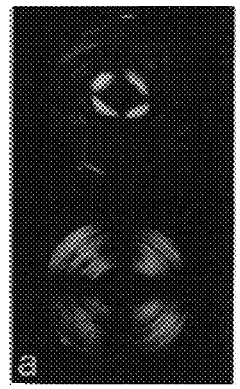
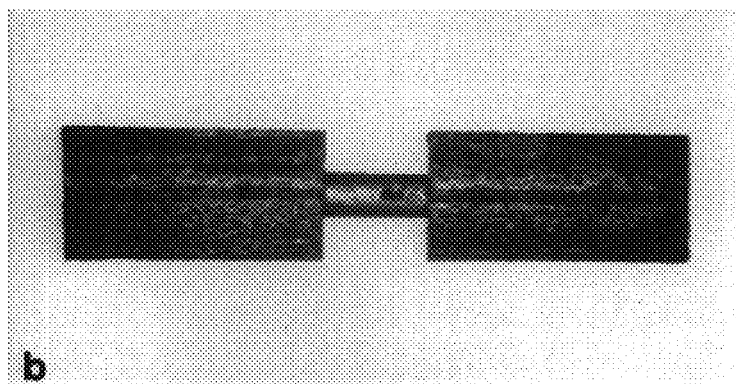

FIG. 12A  FIG. 12B
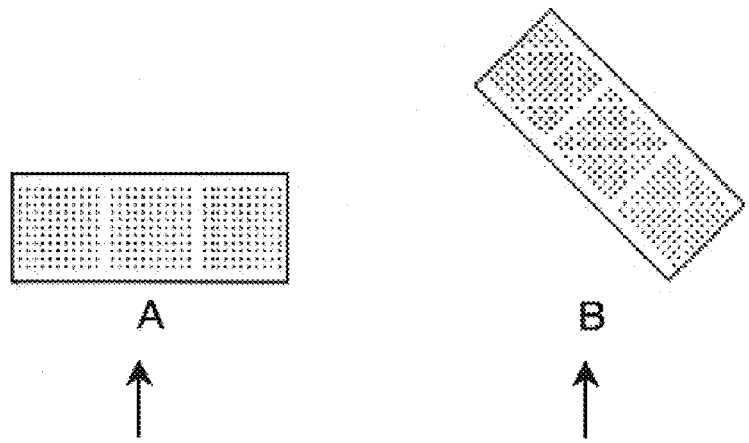
A  B
FIG. 13
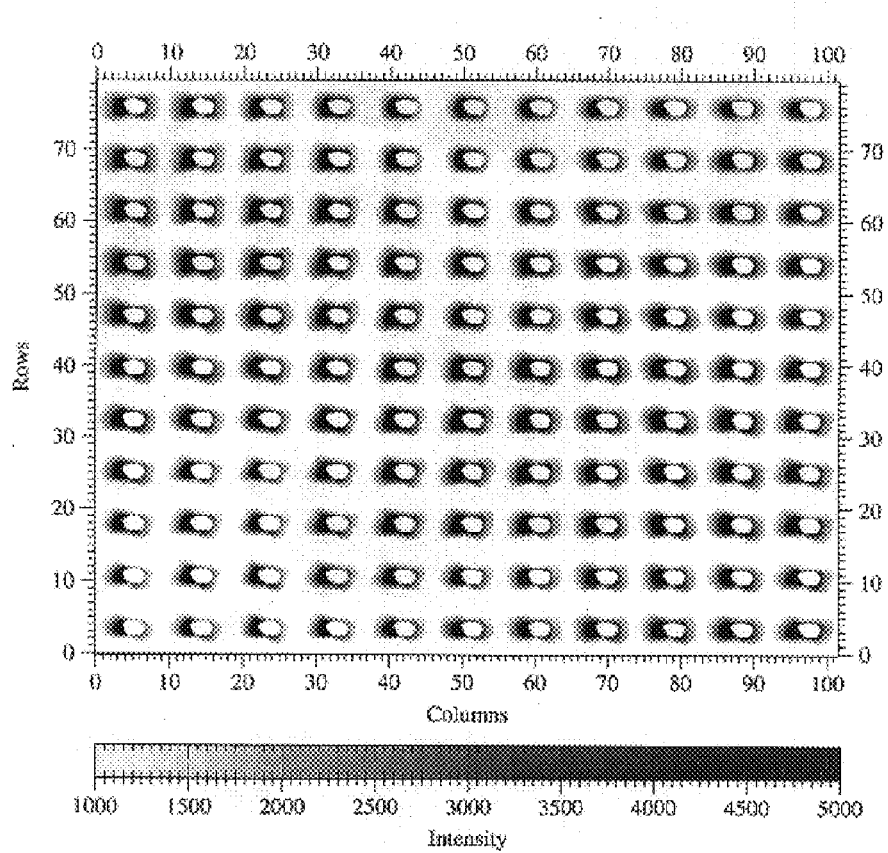

MODELING VISCOELASTIC TORSIONAL PROPERTIES OF OSTEONS

PRIORITY INFORMATION

This application claims priority under 35 U.S.C. §119 from U.S. Provisional Patent Application Ser. No. 60/265,472, filed Jan. 31, 2001, and U.S. Provisional Patent Application Ser. No. 60/336,063, filed Oct. 31, 2001; each of which is hereby incorporated by reference in its entirety. This application is also a continuation-in-part of U.S. patent application Ser. No. 09/981,684, filed Oct. 17, 2001, which is hereby incorporated by reference in its entirety.

FIELD OF THE INVENTION

This invention relates to the viscoelastic behavior of human compact bone's hierarchical structure. Specifically, the present invention relates to modeling of viscoelastic osteon behavior under torsional loading.

BACKGROUND OF THE INVENTION

The viscoelastic behavior of bone is not yet well understood though it has been studied for more than 30 years. Systematic time-dependent mechanical studies have been limited to macroscopic samples and yield conflicting results, probably due to the heterogeneous micro- and ultra-structural composition of the tested macro-samples.

The best available models of long bone shaft either posit homogeneity, based on elastic properties that hypothesize non-existent structural symmetries (Rho, 2000), or non homogeneity, but discounting the lamellar distribution pattern (for a review see, Ascenzi M.-G. et al., 2000). These models do not provide local information for clinical use in orthopaedic and reconstructive surgery and in the design and placement of implants and prostheses because such models do not account for the mechanical properties of bone ultra- and micro- structure.

The currently used morphological classification of adult human bone dates back to Petersen (1930) and views bone as a four-order hierarchy, of decreasing scale. The structures corresponding to gross shape, distinguished as compact and cancellous bone, comprise the first order or macrostructure. The second order of compact bone, microstructure, includes osteons (also known as harvesian systems), their coaxial lamellar layers, and additional related structures, e.g. marrow. The third order, ultrastructure, consists mainly of collagen bundles and hydroxyapatite crystallites with some protein mucopolysaccharides. Molecular patterning between organic and inorganic phases comprises the fourth order.

Osteons

Osteons are the predominant component of bone microstructure (see e.g. Bloom and Fawcetts, 1986). Osteons are centrally provided with a vascular canal bounded by concentric layers of lamellae, each a few microns thick. Osteonic lamellae show molecular organization of a mostly collagen bundle organic framework embedded in ground substance (comprised of sugars, proteins and water) and hydroxyapatite crystallites of orientation analogous to the collagen bundles'. Osteons, a few centimeters long, are between 200 and 300 µm diameter.

Two osteon types have been named after the direction of their fiber bundle direction arrangements, known as "longitudinal" and "alternate". Longitudinal osteons consist of lamellae appearing dark under a polarizing microscope. Alternate osteons consist of lamellae appearing alternatively dark and bright. Dark lamellae, called longitudinal, consist of collagen bundles with marked longitudinal spiral course (Gebhardt, 1907). Bright lamellae, called transverse, were originally hypothesized by Gebhardt to consist of bundles with marked transversal course only, but have subsequently been found (Frasca et al., 1977; Giraud-Guille, 1988; Ascenzi A. et al., 2001) to include oblique bundles as well. Much is yet unknown about the properties and roles of these osteon components. However, longitudinal lamellae are thinner, richer in collagen, and poorer in hydroxyapatite crystallites than transverse lamellae (e.g., Marotti, 1993). Longitudinal lamellae are also hypothesized to contain more ground substance (Ascenzi A. et al., 2001).

The relative percent of mucopolysaccharides within any given osteon must decrease for its calcification to increase (Pugliarello et al., 1970). In fact, the remaining mucopolysaccharides need to form a substrate on which the hydroxyapatite crystallites can deposit and continue accumulating (Herring, 1971). Whether the low amount (less than 1%) of mucopolysaccharides makes a mechanical difference has not yet been investigated. Based on the results of a report by Sasaki and Yoshikawa, (1993), the relative percentage of mucopolysaccharides in each osteon type would probably differ between initial and final stages of calcification. Further, Minns et al. (1973) indicates that removal of ground substance in several connective tissues may decrease time-dependent mechanical effects.

Mechanical Testing of Osteons

Osteons have been studied for some 40 years. Frasca et al. (1976) isolated whole osteons from surrounding bone at their natural boundaries, but the irregular shape of osteons so isolated prevents systematic mechanical study. More recently, Ascenzi A. et al. (1994) provided a technique to isolate osteon samples of regular, uniform shape, suitable for systematic testing.

Mechanical testing of osteon samples has been limited to quasi-static monotonic testing (see Ascenzi M.-G. et al., 2000). Osteon sample testing uniformly confirms the dependence of their mechanical behavior on calcification, as established by the method of Amprino and Engstrom (1952) and collagen bundle direction distribution. Quasi-static cyclic torsional testing is underway (Ascenzi M.-G., 2000). The incompleteness of osteon research is principally due to the challenges presented by their microdimensions. Indeed, osteon sample isolation and testing is lengthy and requires competent personnel, as well as the custom design and fabrication of high-precision apparatuses for sample loading and property recording.

Viscoelasticity

Material science regards viscoelasticity as a characteristic feature of polymer containing materials. Bone, like most biological materials, contains polymers. Viscoelastic properties depend on temperature and moisture content, which the work will hold constant at physiological level. In viscoelastic materials, some of the elastic energy generated by application of external forces is dissipated as heat. Such dissipated energy may contribute to the force driving the bone remodeling process (Levenston and Carter, 1998).

Studies of the mechanisms that generate bone viscoelasticity, that can shed light on the physico-chemical origin of Wolff's law and the properties of osteons, have not yet been conducted. However, osteon viscoelastic behavior could differ between longitudinal osteons and alternate osteons at the same degree of calcification (initial and final) and within each osteon type between initial and final stages of calcification. The only reported mechanical testing of whole osteons, isolated at their natural boundaries, is a preliminary non-systematic monotonic dynamic torsional loading (Frasca et al., 1981). It indicates structure and strain dependence of shear storage modulus in osteons of unspecified type and degree of calcification, and a linear viscous behavior up to strain values of $10^{-4}$. However, this model does not explain the behavior of the osteon structural components.

Thus, there is a need in the art for a hierarchical geometric material bone model built on a solid understanding of bone ultra- and micro-structural mechanical properties. Such a model could provide clinicians with a tool to fundamentally improve the precision of their interventions. There is a further need in the art for knowledge about osteon sample behavior under dynamic loading in terms of osteon structural components. For such knowledge, the viscoelastic behavior of osteons, and the influence of calcification and collagen bundles' direction distribution on the viscoelastic behavior of osteons, will need to be elucidated. Another important parameter, the relative percentage of collagen and mucopolysaccharides in terms of osteon and lamellar types, has not yet been investigated. The work described herein addresses these and other needs in the art.

SUMMARY OF THE INVENTION

The present invention provides a geometric/material model of hierarchical bone based on the mechanical properties and relative components of osteons. The model is based upon experimental studies of the microstructural viscoelastic properties (in terms of ultra-structural properties) of the osteon, the predominant microstructural component of adult bone.

Thus, the invention provides a model of the properties or behavior of compact bone, particularly osteons. The model preferably comprises viscoelastic properties of osteons which include osteon mechanical properties and collagen-bundle orientation, and/or the relative osteon content of collagen and mucopolysaccharides. In one embodiment, the model comprises one or more elements selected from the following group: osteon mechanical properties; collagen-bundle orientation; the relative content of collagen and mucopolysaccharides in osteons; hydroxyapatite content; lacunae, canaliculae, and other porosity fluids within the pores; amounts of osteocytes and osteoblasts, and relative contents of other proteins.

The invention also provides a method of predicting deformation and fractures of bone using a model based on the viscoelastic properties of bone or osteons. According to this method, the effect of torsional loading in terms of microcracking, debonding, breakage, and void growth can be predicted from a model based on collagen-bundle orientation and/or the relative contents of collagen and mucopolysaccharides in osteons.

In addition, the invention provides a method of identifying the requirements of bone reconstruction and prosthesis using a model of the viscoelastic properties of compact bone. This method could, for example, utilize simultaneous computer simulation, based on the model of the invention, of the interaction of a patient's bone and the bone used for reconstruction or prosthesis.

The invention further provides a mechanical method for studying osteon specimens of prescribed shape, dimensions, lamellar type arrangement, lamellar thickness and degree of calcification for viscoelastic behavior. This method is preferably based on structural and dimensional analysis of individual lamellae and controlled dynamic torsional tests.

The invention also provides a model for the properties of bone based on the relative percentages of collagen and mucopolysaccharides in osteons. Preferably, the model also comprises results from mechanical testing, for example, torsional loading, of osteon specimens of the same specifications as those subjected to biochemical analysis for collagen and mucopolysaccharide content. In one embodiment, the model takes into account the influence of collagen orientation versus percentage contents of collagen and mucopolysaccharides to assess the influence of these constituents on the viscoelastic response of the osteon specimens. In another embodiment, there is a correlation between the distribution of the percentages of collagen, mucopolysaccharides with the orientation of collagen bundles at both initial and final degree of calcification.

Furthermore, the invention provides a Finite Element Model (FEM). This model reflects the geometry, distribution and orientation of the identified osteon component elements. In one embodiment, FEM incorporates known structural porosity (canaliculae and lacunae) to properly reflect the microscopic structure of the single osteon. Preferably, a three dimensional model containing a large number of elements is prepared to represent the constituents in sufficient detail so that the results converge. The model can be parametrically exercised, within the limits of known property variation, to allow for biological variations and to study biological effects. This can include variation of the porosity distribution and of the bulk modulus in the porosity to assess the effect of fluid in the structure. Finally, the effects of these parametric manipulations on fracture and failure characteristics can be investigated.

BRIEF DESCRIPTION OF DRAWINGS

The patent or application file contains at least one drawing executed in color. Copies of this patent application publication with color drawing(s) will be provided by the Office upon request and payment of the necessary fee.

FIG. 2. Schematic drawing of torsional loading device used in the Examples. 1=Rotational axis with its jaws 2; 3=hard metal wedges of the pendulum loading system; 4=the wheel around which the thread, lodged with weights, is attached; 5=the axis of the pendulum; 6=the mirror that reflects the laser beam onto the graduated scale to detect angle-of-twist variations.

FIGS. 7A and 7B. (A) Cross section of two isolated osteons: longitudinal (above) and alternate (below), ×110. (B) Osteon specimen (inner diameter: 40 μm; outer diameter: 210 μm; length: 500 μm) with its lugs, ×30.

FIG. 12. Diagram of relative inclination of dark (a) and bright (b) lamellae with respect to the incident beam. Dots indicate chosen locations of scanning.

FIG. 13. SAXS images of dark lamella. The images are unchanged across the scanned area.

Figure 1A:
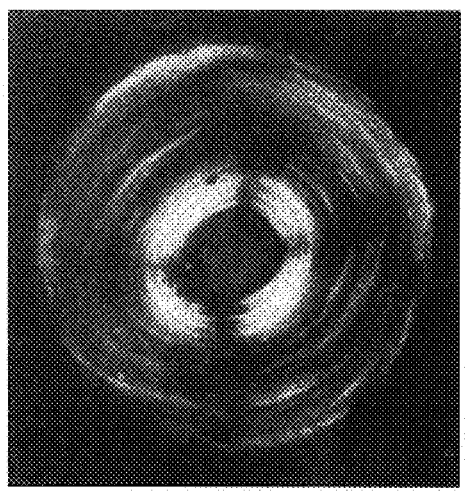
FIG. 1A, 1B, and 1C. (A) Cross section of isolated longitudinal osteon (outer diameter: 225 μm). (B) Cross section of isolated alternate osteon (outer diameter: 225 μm). (C) Isolated osteon sample with lugs for torsional loading (inner diameter: 52 μm; outer diameter: 225 μm; length: 500 μm).

The patent or application file contains at least one drawing executed in color. Copies of this patent or patent application publication with color drawing(s) will be provided by the Office upon request and payment of the necessary fee.

DETAILED DESCRIPTION OF THE INVENTION

The present invention describes a method for modeling the mechanical behavior of bone, based on the viscoelastic properties of osteons. One of the fundamental issues to explain the mechanical behavior of bone is to understand how bone's elementary components separately and in combination respond to loading. Dynamic loading of macroscopic bone specimens yields results with apparently confusing implications as to viscoelastic bone behavior (Sasaki, 2000). Some of the contradictions derive from the variability of relative percentages of collagen, hydroxyapatite and mucopolysaccharides and of collagen bundle and hydroxyapatite directional arrangements within and across the specimens. To gain control over such variables, the hierarchical and heterogeneous structure of macroscopic bone requires descent from bone's first to its second hierarchical level, i.e. the microstructural level. The present invention concerns the role and interplay of collagen, hydroxyapatite and mucopolysaccharides during dynamic torsional loading of single secondary osteon specimen groups, across which the elementary component variables are held reasonably constant. In particular, the role of the elementary components are related to experimentally induced fractures by means of a novel computerized, geometric/structural viscoelastic osteon model.

The findings set forth in the Examples show that both the osteons' elementary components and their viscoelastic mechanical behavior depend on collagen bundle orientation and hydroxyapatite density. The experiments described therein explore these dependencies through a combination of chemical and mechanical procedures, linked by mathematical analysis and computer modeling, to examine the ultrastructural variables which regulate microstructural viscoelasticity and also dynamic torsional behavior.

The model of the invention is based on the viscoelastic properties of the microstructure (osteons) in terms of the ultrastructure, and in the development of a hierarchical structural model for normal bone and for bone pathologies (especially pathologies that leave the hierarchy unaltered). Other steps in the development of the model includes (a) experimentation to relate these properties to those of osteon groups and of interstitial bone; (b) the application of the known distribution of microstructural lamellae in the long bone shaft; and (c) homogenization methods and finite element analysis to link the properties of osteon groups and interstitial bone to the macroscopic viscoelastic properties. The hierarchical bone model accurately predicts local strains and stresses due to loading. This supercedes current models, which assume orthotropy and/or gross non-homogeneity. The model can serve to resolve clinically significant local issues related to bone implants and prostheses, such as screw loosening and interface material incompatibility. It can be used to achieve a new understanding of the viscous energy-dissipating mechanism relevant to bone remodeling, identify the effects of pathological collagen on macroscopic bone mechanical properties. The model can also assist researchers in understanding the mechanics of other natural composites and designing new composites.

Definitions

As used herein, "about" or "approximately" shall mean within 20 percent, preferably within 10 percent, and more preferably within 5 percent of a given value or range.

The present invention spans through both elastic and plastic ranges. As used herein, the term "elastic range" refers to the stress and strain values for which the material structure does not break and returns to its original shape when the force is removed. The term "plastic range" refers to the stress and strain values for which the material structure does break and therefore does not return to its original shape when the force is removed. When an increasing force (starting from zero) is applied to a material, the material undergoes first elastic and then plastic deformation. Any bone type can undergo elastic deformation only or both elastic and plastic deformation depending on the force magnitude. Elastic and plastic deformations provide a starting point to predict strain and stress distributions and fractures of bone. The model also may be used to compute the stress distribution from the strain distribution and strain distribution from elastic and plastic deformations. It further identifies the requirements of bone reconstruction and prostheses.

The term "boundary conditions" refers to the relative movements of the boundaries of the various hierarchical structures under loading. In a specific embodiment, the behavior of the cement line under loading is the boundary conditions for the osteon and the interstitial bone between which the cement line lies.

The term "pinching" refers to a sharp change of stiffness of bone. As used herein, the change in stiffness can be either from increasing stiffness to decreasing stiffness or from decreasing stiffness to increasing stiffness. In a preferred embodiment, the change presents itself on each half-cycle.

The term "material analog" refers to a model or reproduction produced from material, as distinguished from a mathematical or computer model.

The term "distraction device" refers to an apparatus that generates bone by stimulating growth of existing bone by application of forces to such existing bone.

As used herein, the term "strain distribution" refers to a measure of the degree of elongation at any point on a sample. In a preferred embodiment, the sample is bone.

The term "stress" refers to the force per unit area.

The term "stress distribution" refers to strain distribution and on the mechanical property distribution throughout the body.

The term "corrected break area" refers to the actual bone area, except for the lacunae and canaliculi, subjected to stress in the vicinity of a break.

The terms "viscous effect" and "viscoelastic" refer to a system that exhibits behavior that combines liquid-like and solid-like characteristics. In particular, this term herein refers to the viscoelastic properties of osteons. According to the invention, these viscoelastic properties include one or more of the following parameters: osteon mechanical properties (e.g., elastic and viscous constants for osteon specimens, torque versus angle-of-twist behavior, etc.), degree of calcification of osteons, the relative contents of collagen and mucopolysaccharides in osteons, collagen-bundle orientation in osteons, osteon hydroxyapatite content, amount of lacunae and canaliculae porosity fluids within the pores, osteon content of osteocytes and osteoblasts, as well as the contents of other proteins present in osteons. Preferably, these parameters are measured in both longitudinal and alternate osteons.

A Finite Element Model, or "FEM", is a well-known method for modeling. According to this model, the gross shape of the object, e.g., a bone, that one wishes to model is filled with homogenous elements (e.g., 3D brick-shaped) in a finite number. The mechanical analysis is conducted on the individual elements, so that elastic or viscoelastic properties are declared for each element. The loads and boundary conditions are applied to the gross shape through the distribution of loads on the element. At this point, one can compute the strain and stress for each element. A sufficient number of elements must be applied so that the strain and stress distributions are compatible along the boundaries between any two adjacent elements. The principles of FEM has been described, e.g., in Dwoyer et al., (1988), which is hereby incorporated in its entirety.

A "reference osteon" is a set of osteon data and/or parameters representative of an osteon to be used in the model of the invention.

Experimental Design

The experiments conducted as described in the Examples examine the behavior of elementary components of adult human compact bone tissue during dynamic loading of its microstructure. The link between biological composition and mechanical function are investigated through several sets of experiments. For example, one set addresses properties of the ultrastructure, and another addresses the behavior of the microstructure under dynamic torsion.

In particular, these experiments examine secondary osteons to evaluate whether collagen bundle arrangements and degree of calcification indicate or determine the relative percentages of collagen and mucopolysaccharides and characteristics of dynamic loading behavior. "Secondary osteons" are present in adult bone, as opposed to "primary osteons", which are present at earlier stages of development. These experimental data can be used to create a numerical model for bone viscoelastic behavior according to the invention.

The present invention also provides experimental designs to assemble data for the model of the invention. For example, osteon samples of varying hydroxyapatite crystallite density and collagen bundle arrangements can be mechanically tested under dynamic torsional loading at low and high strain rates. The viscoelastic properties identified can be related to the biochemically obtained relative percentages of collagen and mucopolysaccharides. A computerized geometric-material model, based on the experimental findings and observations of sample fracture, is then created to describe viscoelastic osteon behavior under torsional loading in terms of microcracking, debonding, breakage, and void growth.

The model of the invention is founded on the recognized dependency of bone's macrostructural properties on osteon properties established by osteon ultrastructure (Rauber, 1873; Evans, 1958; Currey, 1959; Evans and Vincentelli, 1969; Vincentelli and Evans, 1971; Portigliatti-Barbos, 1983, 1984, and 1987; Boyde et al., 1984; Ascenzi A. et al., 1987a and 1987b; Katz, and Meunier, 1987; Ascenzi A., 1988; Carando et al., 1989 and 1991; Boyde and Riggs, 1990; Crolet et al., 1993; Hert et al., 1994; Ascenzi M.-G., 1999a). The model is also based on observed mechanical properties of osteons, using methods of the invention, which can neither be inferred from macroscopic samples nor derived by purely mathematical models.

Indeed, some microstructural properties are absent at the macrostructural level and are not susceptible to inference by purely mathematical models (Pidaparti and Burr, 1992). For instance, osteon samples under monotonic torsional loading display a shear modulus larger than that of macroscopic samples. This unanticipated result arises through localized slippage at cement lines in larger macroscopic samples. Also, tension-compression hysteretic loops of osteon samples (Ascenzi A. et al., 1985, 1997) are S-shaped, in contrast to the monotonically increasing behavior of macroscopic specimens. This result was not anticipated due to incomplete knowledge of the ultrastructure as well as the absence of such phenomena in macrostructural samples, possibly due to the mechanical role of cement lines. Close linkage of mathematical models to micromechanical empirical results such as these has led to prediction of lamellar stiffness (Ascenzi M.-G., 1999b) subsequently confirmed empirically (Meunier, 1999; Rho et al., 1999).

The present model will elucidate three specific elements towards the long-term goal of understanding how human bone macro-structure responds to function. These elements are as follows.

Viscoelastic properties of macroscopic compact bone need clarification (Sasaki, 2000). Starting in 1965 with Currey, and with Smith and Keiper, viscoelasticity has long been recognized as one of the important properties of bone. However, divergent experimental conditions and parameters impede meaningful comparison of the various time-dependent tensional and compressional studies on macroscopic compact bone samples, e.g. Smith and Keiper, 1965; McElhaney, 1966; Lugassy, 1968; Sammarco, 1971; Black, 1972. Comparison under the hypothesis of linear-viscosity (Lakes and Katz, 1974) found conflicting results and pointed to a macroscopic nonlinear-viscoelastic behavior. This conflict may arise from the lack of consideration of the heterogeneity of the macrosamples' ultrastructural composition, i.e. collagen bundles and hydroxyapatite densities and their arrangements. Time-dependent torsional studies on macroscopic samples show nonlinear-viscoelastic behavior (Lakes and Katz, 1979a, b, c). For osteon groups, Frasca and Katz's studies suggest a decreasing trend of strain values at the onset of plasticity with increasing number of osteons. The authors explain such decreasing trend in terms of mucopolysaccharides, the principal constituent of cement lines. None of the above-mentioned results derives from a systematic study or has been experimentally correlated to the samples' micro- and ultra-structural components. The present work relates the osteon viscoelastic properties to the properties of the ultrastructural components. While the mineral phase behaves purely elastically (Katz and Ukraincik, 1971), collagen and mucopolysaccharides are viscoelastic in nature. The known non-linear viscoelastic properties of collagen are limited to studies from tendon (Haut, 1983). There are no explicit data available on the viscoelastic properties of mucopolysaccharides from bone. According to the invention, the viscoelastic behavior of bone microstructure depends on the viscoelastic behavior of collagen and mucopolysaccharides and the structural organization of collagen bundle directions. Mucopolysaccharides are believed to be bonded to the surfaces of collagen and/or hydroxyapatite crystals and embedded within the ground substance (Herring, 1971; Butler, 1984).

Dynamic torsional loading, used to evidence the viscoelastic properties of the macrostructure, serves to incorporate the role of microstructure in terms of ultrastructure. Torsional loading in bone has been analyzed using finite element analyses (e.g. Martens et al., 1980; Spears et al., 2001). These models suffer from oversimplifications that posit non-existent structural symmetries and homogeneities. Such assumptions do not reflect the heterogeneity of the micro level. Macroscopic samples do not always have the same mechanical properties as the microstructure that comprises them, and overlooking them impedes a realistic understanding of bone mechanics. For instance, experiments on quasi-static torsional loading of microstructures revealed (Ascenzi A. et al., 1994) that the torsional shear moduli of osteons are much larger than shear moduli obtained for macroscopic samples. That is, slender samples are stiffer than thick ones. Slippage of osteons at the cement lines during torsion of macrosamples may explain the lower stiffness in thick samples. Cosserat elasticity theory (Lakes, 1995) well describes such slippage because it allows a moment per unit area in addition to the usual force per unit area of classic elasticity theory.

Mechanisms for initiation and propagation of viscoelasticfracture of macroscopic bone. Dynamic fracture propagation has not been modeled in terms of ultrastructural components, although the fracture mechanism of bone depends on bone structural and composition properties such as collagen architecture and collagen content (e.g., Jepsen et al., 1999). Jepsen finds that fracture in macroscopic samples is ductile and that fracture alters bone's viscous mechanism; in particular, relaxation increases with the increasing extent of fractures. Consequently, viscous effects in osteon samples can increase with the increasing extent of fracture.

According to the invention, and as described in the Examples, osteon samples show a linear viscoelastic behavior, at least in the physiological strain range, explained by the Ramberg-Osgood equation. Osteons consisting of longitudinal collagen bundles (longitudinal osteons) resist torsional stresses better than osteons consisting of alternatively longitudinal, oblique, and transverse collagen fibers (alternate osteons) regardless of the relative hydroxyapatite crystallites percentage. The viscoelastic effects are less evident in longitudinal than alternate osteons because longitudinal osteons contain relatively less collagen and mucopolysaccharides, two viscosity factors. The viscoelastic effects are more evident in both osteon types at lower rather than higher levels of hydroxyapatite crystallites because lower hydroxyapatite levels correspond to higher mucopolysaccharides levels.

Elementary Components of Secondary Osteons

Knowledge of compact bone microstructure results from a variety of refined techniques and sophisticated mechanical devices focused on the behavior of the complex biological and mechanical interplay of ultrastructural components in the microstructure as a whole (for a review, see Ascenzi M.-G. et al., 2000). Such research has shown, for example, how collagen and hydroxyapatite distribution and density determine the mechanical properties of osteon and lamellar specimens.

The studies described in the Examples relative to the ultrastructure of osteons' lamellae and the viscous behavior of single osteons provide a novel perspective on the link between viscoelasticity and osteon ultrastructural parameters of collagen and hydroxyapatite crystallites. Through these experiments, the viscous behavior of the single osteon is systematically evidenced for the first time in isolated osteon specimens of the same shape and dimensions. The results confirm the non-systematic findings of Frasca et al. (1981) on single osteons of various dimensions.

Various authors, e.g. Katz and Ukraincik (1971) and Frasca et al. (1981), point to collagen and mucopolysaccharides as the components responsible for viscosity, because they are viscous in nature even though the known non-linear viscoelastic properties of collagen are limited to studies from tendon (Haut, 1983). However, up until now, explicit data have not been available on the viscoelastic properties of mucopolysaccharides from bone. Osteonic lamellae show molecular organization of a mostly collagen bundle organic framework and hydroxyapatite crystallites of orientation analogous to that of the collagen bundles. Mucopolysaccharides are embedded in the ground substance and are thought to be bonded to the collagen and/or hydroxyapatite crystal surface (e.g. Herring, 1971; Butler, 1984). When the ground substance is removed from several connective tissues, the time-dependent mechanical effects decrease (Minns et al., 1973). This result further points to the role of collagen and mucopolysaccharides in the viscous behavior of osteons. Further, the relative percentages of mucopolysaccharides and hydroxyapatite in single osteons are indicated to be inversely proportional (Pugliarello et al., 1970). In fact, the mucopolysaccharides need to decrease for the formation of a substrate on which the hydroxyapatite crystallites can deposit and continue to accumulate (Herring, 1971; Sasaki and Yoshikawa, 1993).

The present invention considers lamellar structure. Thus, the invention addresses the long standing question of whether the histological and radiological differences observed in osteon lamellae are due to differences in fiber orientation (as proposed by Ebner, 1887 and elaborated by Gebhardt, 1906) or composition (as theorized by Ranvier, 1887; Ruth, 1947; Rouillier et al., 1952; Rouillier, 1956). Such theories concern particularly the osteon type consisting of an alternating series of two different lamellar types (so-called alternate osteon). While Gebhardt's theory has for a long time served as a useful model in approaching and clarifying the micromechanical behavior of isolated osteonic specimens, at present Gebhardt's theory is far from universally accepted. The experiments described in the Examples support a combination of the two types of theories. On one hand, these findings support a version of Gebhardt's model, previously supported by various authors e.g. Frasca et al. (1977); Giraud-Guille (1988); Ascenzi A. et al. (1982). That is, dark and bright lamellae differ in collagen bundle and hydroxyapatite crystallites orientation. In particular, lamellae which appear dark in cross-section under polarizing light, contain longitudinal collagen bundles and hydroxyapatite patterns. Lamellae which appear bright in cross-section under polarizing light contain transverse collagen bundles and hydroxyapatite patterns. On the other hand, the same new techniques indicate differences in composition. As described in the Examples, longitudinal collagen bundles lie closer to each other than oblique and transverse collagen bundles, leaving less space between them for the ground substance and therefore mucopolysaccharides. A striking difference is found between the hydroxyapatite pattern orientation within the two lamellar types. Lamellae which appear dark in cross-section under polarizing light are thicker than lamellae appearing bright, confirming the observations of Marotti (1993). Further, wet lamellar thickness varies in relation to collagen bundle orientation and that the different changes in lamellar thickness between dry and wet states point to a difference in mucopolysaccaride percentages and collagen bundle orientation in the two lamellar types.

This shows that the viscoelastic behavior of single osteons depends on the viscosity of collagen and mucopolysaccharides, whose relative percentages depend on collagen bundle directional arrangement and the amount of hydroxyapatite present.

Osteon Specimens

Osteons vary in diameter (200–300 µm) and length (up to a few centimeters). Osteons consist of generally coaxial cylindrical layers called lamellae that are only a few microns in thickness. Osteons vary in terms of arrangements of dark and bright lamellae in cross section under (circularly) polarized light and in degree of calcification from dark gray to white on micro-x-ray. For a meaningful systematic study, all osteon specimens need to have the same dimensions and structural characteristics while maintaining the characteristics of the gross entity from which they are selected as specimens. The four above-mentioned variables can be dealt with realistically as follows:

Shape and dimension of specimens. A central cylindrical portion of the osteon around a 40±3 µm vascular canal with an external diameter of 210±3 µm avoids the irregularities of interstitial bone and a length of 500 µm avoids the discontinuities of Volkmann's canals.

Collagen bundle make-up. The examination of compact bone sections under the polarizing microscope reveals that all osteons are composed of lamellae that appear dark and lamellae that appear bright. Examination of thousands of bone sections has revealed that osteons made up exclusively with bright lamellae are rare; that all prevalently dark osteons show a thin layer of bright lamellae around the harvesian canal; and that among all the different combinations of dark and bright lamellae in osteons, osteons made up of essentially dark lamellae (so-called longitudinal osteons) and osteons made up of alternatively dark and bright lamellae (so-called alternate osteons) represent two ends of a spectrum, biologically and mechanically. Therefore, longitudinal and alternate osteons were chosen for the investigations set forth in the Examples.

Degree of calcification. Examination of micro-X-rays of compact bone sections shows a spectrum of shades, from dark gray to white, which indicate the degree of calcification from initial to final (Amprino and Engström, 1952) of osteons, as a whole. Osteons at the initial stage of calcification comprise 5–10% of adult compact bone, and this percentage decreases with age. Osteons at the final stage of calcification constitute the majority, close to perhaps 90%. The level of hydroxyapatite in osteons at final stages of calcification is usually considered to remain constant within a 27 to 49 age group. In a preferred embodiment, osteons at initial and final stages of calcification obtained from donors in this age group are modeled by the invention.

Number and thickness of lamellae. The distribution of lamellar number and thickness varies from osteon to osteon. Lamellar thickness from lamella to lamella from the cement line to the haversian canal (Rho et al., 1999; Ardizzoni, 2001) and within the lamella along the osteon length (Ascenzi A. et al., 1982) also varies from osteon to osteon. Lamellar number can be counted and thickness measured at both ends of the cylindrical portion of the osteon specimens under polarized light. Since the lamellar boundary is wavy along the lamellar 500 µm length, the thickness values obtained under polarized light for dark (bright, respectively) lamellae may be smaller (larger, respectively) than the ones obtained on thinner (70–100 µm) sections. While this potential discrepancy can affect absolute measurements, it does not affect comparative investigations. About 15–20 osteon specimens, quite homogeneous with respect to lamellar number and thickness of lamellae, can be obtained from the mid-diaphysis of a single human femur.

EXAMPLES

The present invention will be better understood by reference to the following Examples, which are provided to illustrate the invention and which do not in any way limit the invention or the accompanying patent claims.

Example 1

Osteon Viscous Behavior and Mucopolysaccharide Content

This Example reports two studies which provided information on osteon viscous behavior. The results show that the mucopolysaccharide content is higher in alternate rather than longitudinal osteons. These osteons can be modeled accordingly.

The bone material came from the femoral shafts of human cadavers, aged between 18 and 55, obtained in accordance with American regulation and free from evident skeletal faults and infectious diseases such as AIDS, hepatitis A and B, and syphilis.

First Study

Six osteon samples, obtained as described below, were subjected to twist and hold testing to evidence their viscous behavior through relaxation. Osteon sample isolation was achieved by applying the methodology described in Ascenzi A. et al. (1994). By means of a rotating-saw microtome, longitudinal segments about 30 mm long were first sawn from the femoral shaft. The segments were sliced in 350 µm thick longitudinal sections (i.e. slightly thicker than an osteon). A continuous water-spout was incorporated to the saw to prevent any overheating of the material.

The samples for torsional loading (FIG. 1C) were isolated in two stages from longitudinal sections. During the first stage the sample, consisting of the central portion of an osteon, 500 µm in length, with the ends penetrating into two rectangular lugs, was separated from the bone section using a specially constructed device which includes a dental drill as described in Ascenzi A. and Bonucci (1968) and Ascenzi A. et al. (1990). As isolation of the central portion of the osteon is achieved by drilling, its section has a coarse, square shape. During the second stage, a micro-grinding lathe was used to give the central portion a cylindrical form, with the haversian canal running through it axially. The lathe to be used was designed and developed by the CECOM Company and is described by Ascenzi A. et al (1994). The device grinds the sample by a minute steel blade whose edge, 500 µm long, is equal to the length of a coarsely isolated sample. The forward and backward movements of the blade are monitored by a micrometer. The length and other dimensions of the various samples were kept virtually constant; one criterion for the choice of the samples is that the haversian canal measure 403 µm in diameter. Additionally, a stopper controls the forward and backward movement of the steel blade on the micro-grinding lathe to provide a series of samples whose external diameter equals 210±3 µm. The relative dimensions of the osteon samples may appear not to conform to those conventionally suggested for material testing. They reflect conditions made necessary by the distinctive nature of bone microstructure. In particular, 500 µm is the maximum length compatible with the avoidance of Volkmann's canals in the wall of the specimen. An external diameter of 210 µm is the maximum dimension possible that ensures that portions of the neighboring structures are not included in the sample as a result of irregularities in the thickness of an osteon. The internal diameter of fully calcified osteons averages 40 µm.

Figure 1B:
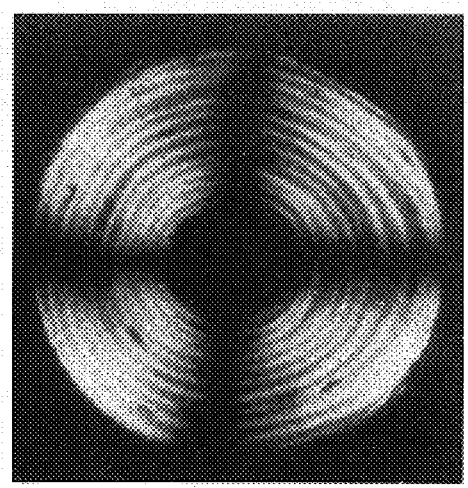
Figure 1C:
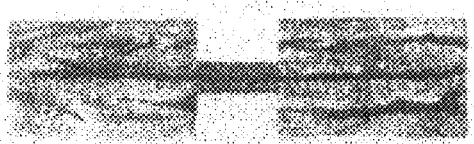

FIG. 1C shows a completely isolated osteon sample held within rectangular lugs. The lugs allow the sample to be firmly attached to the device while experimental diagrams are recorded. The central portion of each sample is only 500 µm long; consequently, the sample does not include Volkmann's canals, which would behave as discontinuities. This was determined by inspection under an optical microscope, which also checks that there are no small surface defects that could alter the shear modulus values in torsional testing. The canal's position and orientation were assessed by checking the distance between vascular canal and external surface of sample at various rotational angles and levels. Because osteon types can be identified from a prepared cross section only after a sample has been tested, between 1,600 and 2,000 samples are prepared to obtain 120 working samples (15 osteon samples per osteon type at initial and final stages of calcification), which will satisfactorily complete the procedures adopted for the recording of the experimental diagrams under torsion at low and high strain rates.

The apparatus used is the one described by Ascenzi A. et al. (1994) to test osteons under quasi-static torsion to failure. This device consists of a rotational axis, point (1) in FIG. 2, with two sets of jaws, point (2) in FIG. 2, which grip the sample during testing. The jaws are oriented along the same axis but none of them are free to move axially. This sets up an axial loading effect, which could influence absolute measurements but may be neglected when, as in this investigation, comparative measurements are considered. One set of jaws is fixed, while the other turns in synchrony with a wheel, point (4) in FIG. 2, measuring 61 mm in diameter. In order to minimize the rotating friction of the turning jaw, a pendulum counterbalance system is incorporated. The axis of the pendulum loading system is indicated as point (5) in FIG. 2. The frictionless fulcrum of the pendulum loading system is the tip of a hard metal wedge, point (3) in FIG. 2. The maximum oscillation of the pendulum is fixed at 55°. A thin light thread, whose section measures 20–60 µm in diameter, winds around the rim of the wheel. Weights may be attached to the thread to load the osteon sample. The angle through which one end of the specimen twists relative to the other during testing is measured by applying an optical method based on the reflection of a laser beam from a small mirror attached to the rotating set of jaws. The variations in the angle of twist are read on a graduated scale placed perpendicularly to the plane of the device, 40 cm higher. The precision and accuracy of the graduated scale coincide with those of the apparatus, as checked by applying experimental procedures. Because the diagrams obtained when testing begins in the counterclockwise (or positive) direction should look essentially like the diagrams obtained when testing begins in the clockwise (or negative) direction, all the diagrams were recorded starting in the counterclockwise direction, according to the standard practice reported in the literature.

This is how the torsimeter was used: Every 11 seconds a 0.1 gram weight was attached to the end of the nylon thread to a total of eight weights. The number of weights was eight because the diagrams of Ascenzi A. and Benvenuti (1994) indicate that 0.8 gram loading with this device correspond to a torque between elastic limit and ultimate strength. The angle of twist corresponding to the 8 weights was recorded after 20 seconds and again after another 40 minutes had elapsed. All six samples showed a non zero angle-of-twist change, i.e. creep. The mean angle-of-twist change observed equals 1.6°.

Second Study

The longitudinal (alternate, respectively) osteon is constituted by longitudinal (alternatively longitudinal and alternate, respectively) lamellae (FIGS. 1A and 1B). Longitudinal and transverse lamellar samples were measured dry and wet inside the alternate osteons, were isolated and observed flat under a confocal microscope. Such examinations yield indication of a higher mucopolysaccharide content in transverse rather than longitudinal lamellae and therefore in alternate rather than longitudinal osteons.

Lamellar thickness and width were measured on 20 transverse and 20 longitudinal peripheral lamellar samples in quintuplicate in dry osteon samples by Delta Sistemi IAS 2000 image analysis system, and again after wetting with a micro-pipette. This table shows means and standard deviations. Thinner longitudinal lamellae were used for comparison with transverse lamellae. It is known that longitudinal lamellae are thicker than transverse ones (see e.g. Marotti, 1994), whether dry or wet. The student t-test is run on the data to determine statistical differences between dry and wet lamellar dimensions.

TABLE 1

Lamellar Thickness

| Sample | Thickness Dry (µm) | Thickness Wet (µm) | Width Dry (µm) | Width Wet (µm) |
|---|---|---|---|---|
| Transverse | 3.30 ± 0.88 | 3.56 ± 0.93 | 70.30 ± 9.28 | 72.45 ± 9.58 |
| Longitudinal | 4.13 ± 1.23 | 4.10 ± 1.10 | 70.30 ± 9.28 | 72.45 ± 9.58 |

Whether dry or wet, transverse lamellae are significantly thinner than longitudinal lamellae when enclosed in alternate osteons. Additionally, wet and dry conditions affect transverse and longitudinal lamellar thickness differently. Transverse lamellae are significantly less thick when dry than wet. In contrast, longitudinal lamellae thickness does not change significantly whether wet or dry. The transverse lamellar thickness increase from dry to wet supports the hypothesis that transverse lamellae contain a higher quota of mucopolysaccharides, which expand with water, and that the transverse collagen bundles in the transverse lamella tightly encircling longitudinal lamella impede expansion. The width of both lamellar types is significantly smaller when dry.

Figure 3:
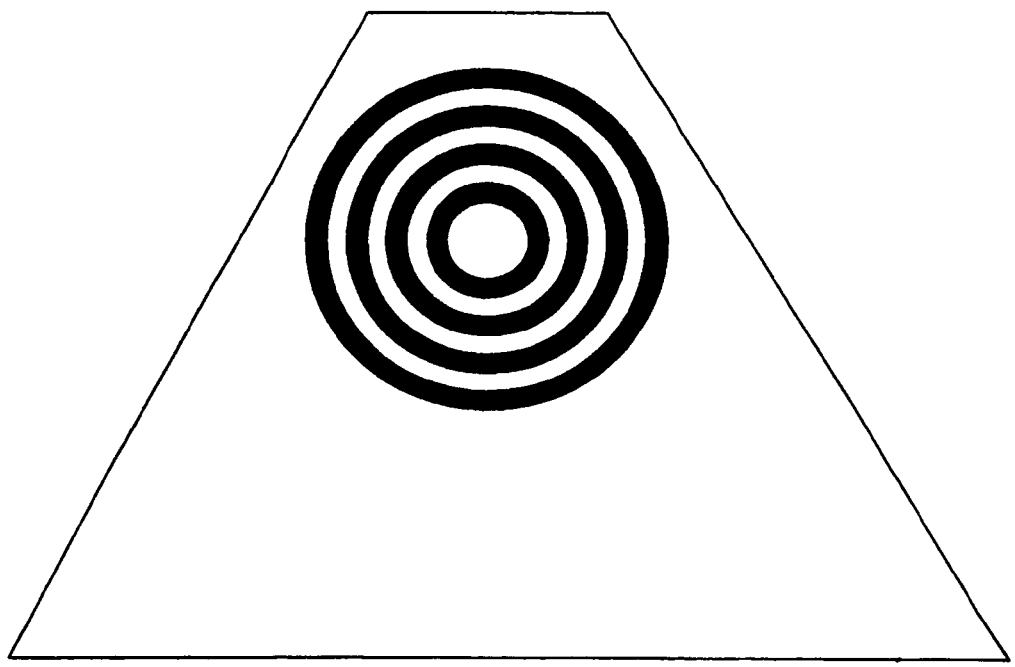
FIG. 3. Diagram showing the trapezoid cut from a thin transverse femoral section around a chosen alternate osteon.

Three longitudinal and 3 transverse lamellar samples were isolated by applying the methodology described in Ascenzi M.-G. et al. (2001). The rotating-saw microtome was employed to cut longitudinal segments about 30 mm long from the femoral shaft. The segments were then sliced in 70±6 µm thick transverse sections. The continuous waterspout prevented the material from overheating. On the thin transverse section, a trapezoid was cut around each chosen alternate osteon sample (FIG. 3). For osteon immobilization during lamellar isolation, a portion of the bone material inside the trapezoid away from the osteon was glued with Kemi®Cyak adhesive to a slide. The longitudinal and transverse lamellae at the periphery of each osteon were dissected with a razor-sharp microscopic blade, obtained by filing a steel needle. To avoid fracture formation during straightening of each lamellar sample, such operation is performed gently on wet samples while checking under an optical microscope. The selection of external lamellae, of lesser curvature than internal lamellae, decreases the risk of fracture formation during flattening. The structure of the isolated and flattened lamellar samples were observed wet under a Leitz confocal microscope. The confocal microscope worked well with the natural fluorescence of wet bone. Because the photomultipliers detect light intensity and not color, red is the color applied to the image.

The longitudinal lamellar samples show a regular arrangement of collagen bundles. From one border to the other, the collagen bundles are parallel to the osteon axis. Each dot is the cut radial collagen bundle that follows the osteocyte process. On transverse lamellar samples, collagen bundles of only one oblique inclination were evidenced for the first time. The transverse lamellar samples show ample areas of ground substance between collagen bundles, parallel and oblique to the flat lamellar borders. The larger areas of ground substance suggest a larger quota of mucopolysaccharides and a perhaps lower quota of collagen in transverse rather than longitudinal lamellae. This supports the hypothesis that, at the same degree of calcification, alternate osteons contain a larger quota of mucopolysaccharides than longitudinal osteons.

Example 2

Viscous Osteon Model

This Example shows the experimental basis for, and subsequent mathematical modeling to create, a viscous osteon model. The study can be described by the following flow chart.

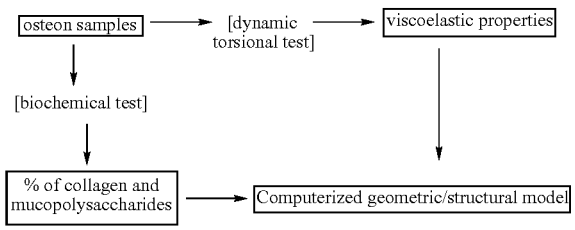

The bone material for this study conforms to the specifications described in the previous Example. Sample selection follows the specifications of Ascenzi A. et al. (1994). The features determining sample selection are their degree of calcification and their collagen bundle and crystallites orientation. Micro-X-ray, the method of Amprino and Engström (1952), provides for the selection of osteon samples at the initial and final stages of calcification. The number of osteons at initial (final, respectively) stages of calcification decreases (increases, respectively) with age. Osteons at initial stages of calcification comprise 5–10% of osteons in the above-mentioned bone age. The two osteon types, which are representative of osteon structures with respect to collagen bundle patterns in fiber orientation in successive lamellae, were selected for this study. On longitudinal bone sections, the two osteon types are easy to recognize only if the section thickness is much smaller than the diameter of an osteon. Longitudinal osteons appear to be almost uniformly bright under the polarizing microscope, while alternate osteons show alternatively bright and dark lamellae. When, as in this case, the thickness of the bone section differs little from the mean diameter of the osteon, concentric lamellae overlap, thereby reducing or precluding the visibility of dark lamellae, and leaving open the possibility that an alternate osteon may have a bright appearance. As a result, identification only becomes certain once a cross section has been cut from the osteon using a microscopic drill (Ascenzi A. et al., 1994). Hence, torsional loading must be performed before undertaking positive identification of the osteon type. On the 500 µm thick transverse bone sections, longitudinal osteons appear to be almost uniformly dark (FIG. 1A); whereas the other type, the alternate osteon, reveals alternately bright and dark lamellae (FIG. 1B).

Samples for Mechanical Testing

These samples are isolated as described above. It is necessary to isolate about 1,600–2,000 to obtain about 120 samples suitable for testing torsion at low and high strain rates (15 osteon samples per osteon type at initial and final stages of calcification).

Samples for Biochemical Analysis

Figure 4:
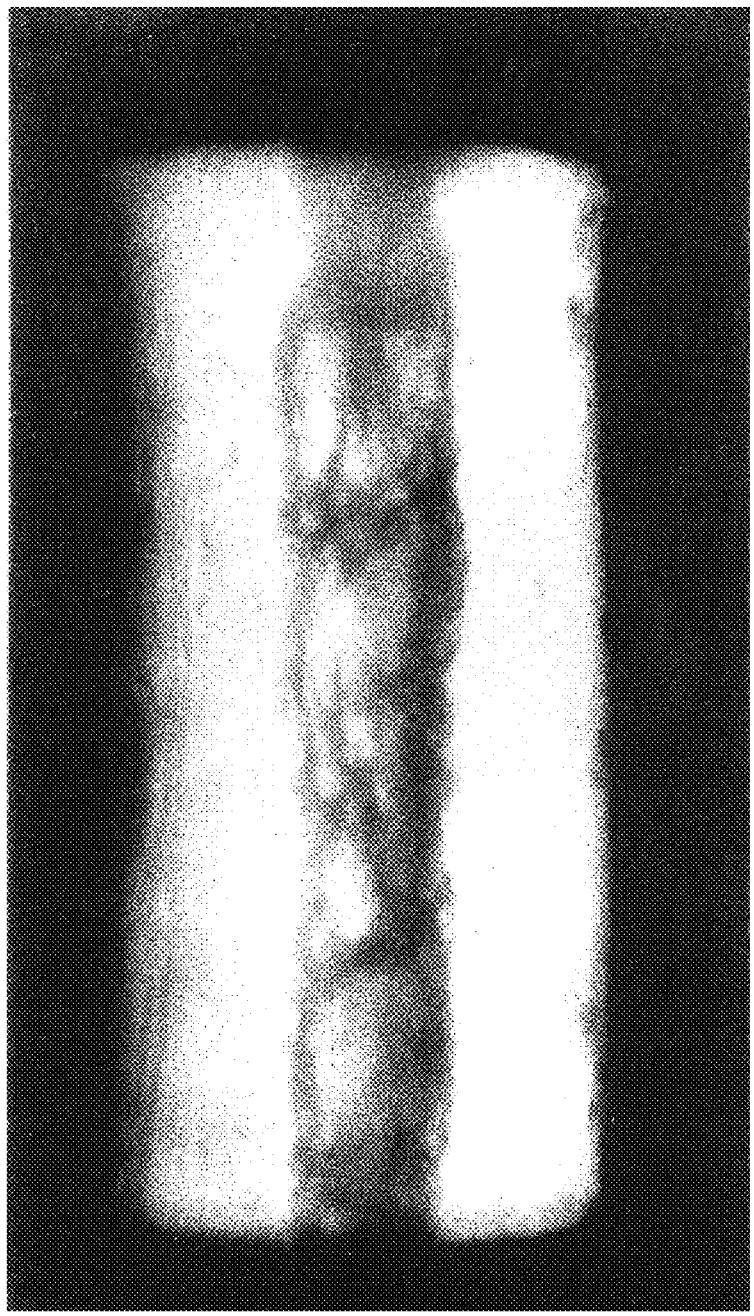
FIG. 4. Isolated osteon sample (under transmitted light) for the proposed biochemical analysis (length 500 μm).

The samples for biochemical analysis are isolated from 500 µm thick transverse sections using the technique of Ascenzi A. and Bonucci (1968). No lugs are necessary, and the type of each 500 µm long osteon sample can be easily recognized on transverse sections. The device used for sample isolation consists of a very thin, carefully sharpened steel needle inserted off-center in a dental drill. As the drill turns, the tip of the needle describes a circle whose diameter may be adjusted to match that of the particular sample diameter. When the rotating axis of the needle is perpendicular to bone section surfaces, i.e. coincides with the osteon axis, the tip of the needle cuts an osteon sample of cylindrical shape with walls of uniform thickness just inside its limits. To ensure that this rotating axis is perpendicular to bone section surfaces, the drill's handle is inserted in a microscope body in place of the tube and the section firmly secured onto the microscope stage. Coarse microscope adjustment controls the needle's movements into the bone section. Osteon cutting is controllable by watching the operation through a stereoscopic microscope. The length and diameter of each sample is accurately measured by means of an eyepiece micrometer. This provides a precise comparison of torsional properties. Individual osteons are not uniform in dimensions. With the dimensions carefully controlled and standardized to exclude defects and other structures, the material properties rather than variable structural properties are determined for the osteons. In the long run, this information can be applied to osteonal structures of varying dimensions under the assumption of homogeneity at the level of the osteon rather than for the macroscopic sample. The criteria of regularity for mechanical loading refer to the position and orientation of the haversian canal. It is necessary that the canal lie midway between the surface of the cylindrical sample and parallel to it, so that torsion is applied around the osteon axis. This calls for the preliminary separation of the osteon sample by application of a technique about to be outlined. This technique allows the position and orientation of the canal to be calculated by measuring its distance from the outer surface of the sample at various levels and rotational angles. After dissection, the harversian canal is cleaned out by inserting a metal rod slightly (10 µm, approximately) thicker than the harvesian canal. FIG. 4 shows the shape of samples prepared with the above-described technique. It is necessary to isolate about 100 osteon samples per osteon type at initial and final stages of calcification to have sufficient material volume for each of the two biochemical analyses.

Mechanical Testing of Wet Osteon Samples

Mechanical testing of wet osteon samples is performed under monotonic torsional loading. Two types of testing are employed. (1) A torsimeter is used to demonstrate creep of the osteons as a function of their makeup. (2) Additional specimens are loaded under displacement control at constant strain rates of $10^{-2}$ and 10 Hz until rupture of the sample occurs. These latter measurements corresponds to low and high strain rates.

Torsimeter Tests

The torsimeter is used as follows.

1) Creep Tests

A 0.8 gram weight is attached at one end of a 20 µm thick tungsten thread, applying a static torque to the specimen. Angle of twist is recorded initially at 5 second intervals followed by longer intervals as the creep stabilizes. Preliminary work indicated that additional creep was insignificant after 40 minutes. The samples are maintained throughout the testing by a saline drip irrigation. This test yields angle of twist versus time for these quasistatic tests. Initially, Kelvin-Voigt and 3-parameter viscoelastic models are used to determine the elastic and viscous constants for the specimens. For the three parameter solid model, for example, the constitutive relation assumes the form:

$$\sigma + p_1 \dot{\sigma} = q_0 \epsilon + q_1 \dot{\epsilon}$$

where $\sigma$ is the applied stress, $\dot{\sigma}$ is the stress rate, $\epsilon$ is the strain and $\dot{\epsilon}$ is the strain rate. The coefficients $p_1$, $q_0$, and $q_1$ represent combinations of the elastic and viscous constants depending on the particular form of the model employed. These coefficients (and hence the associates elastic and viscous constants) are obtained directly from the observed angle of twist versus time diagrams obtained according to the method described by Hayes W. (1972).

2) Low and High Strain Rate Tests

For this series of tests the torsimeter is modified for attachment to an MTS 612 servohydraulic testing machine. The fixed stock of the torsimeter incorporates a reaction torque sensor (5 oz-in capacity). The drive shaft is modified to incorporate a bowstring arrangement to convert the linear actuator displacement to angle of twist. The base of the torsimeter is rigidly mounted to centralize the actuator axis with the bowstring arrangement. Ramp loadings of $10^{-2}$ mm/sec and 10 mm/sec is used to apply torque to the specimens. One output of these results is a plot of torque versus angle of twist recorded in real time. In these tests, the specimens are all taken to failure. According to the invention, there is a direct dependency of the slope of the torque versus angle of twist curves on the loading rate. This is supported by preliminary results demonstrating a significant creep effect. There is also a dependence of this slope on the actual structural material makeup of the osteon samples.

After the mechanical testing, osteon samples are examined under an optical microscope under both regular and fluorescent light (Huja et al., 1999) to assess fracture patterns; measured in terms of diameter and height; and assessed in terms of the number of bright and dark lamellae.

The experimental results include, for example, graphs of increasing functions of the angle-of-twist, which show a concave downward shape starting at the origin of the reference system, regardless of the osteon type and the degree of calcification. According to the invention, the plotted results shows a model in which the observed curves are steeper and less concave for the high (rather than low) strain rate, regardless of the osteon type and the degree of calcification. According to the model, a similar profile applies to the osteon samples at the final (rather than initial) degree of calcification, regardless of the osteon type, for any fixed strain rate. A similar profile again applies to longitudinal (rather than alternate) osteon samples, regardless of the degree of calcification, for any fixed strain rate.

Further, the experimental diagrams of fully calcified osteon samples, according to the invention, are steeper and less concave than the quasi-static experimental diagrams obtained by Ascenzi A. et al. (1994) per osteon type.

Biochemical Assessment of Collagen and Mucopolysaccharides

Biochemical assessment of collagen (as hydroxyprolines) and mucopolysaccharides (as hexosamine) is performed on 150 µg amounts of longitudinal and alternate osteons at initial and final stages of calcification. While it is difficult to quantify small quantities precisely, the uncertainty does not affect the comparative conclusions to be made (Herring, 1972).

Osteon samples are dried to constant weight in a vacuum desiccator over $P_2O_5$. Since decalcification of osteons is necessary to quantify hexosamine and hydroxyproline, acid hydrolysis is used. Residual HCl is removed before the assays are performed. Hydrolysis products are separated using refined chromatographic techniques as first described by Exley (1957).

Hexosamine is determined spectroscopically essentially according to the procedure of Elson and Morgan, (Exley 1957) and modified by Oguchi et al. (1979). The methodology is refined to eliminate the possibility of interference from amino acids and mineral salts (Pugliarello et al., 1970). Hyroxyproline is determined essentially according to the procedure of Serafini-Cessi and Cessi (1965), as refined by Teerlink et al. (1989).

The biochemical analysis has been performed successfully (Pugliarello et al., 1970) on osteon samples at initial and final stages of calcification, regardless of the osteon type. Moro et al. (2000) have employed on rat bone a technique refinement that can be applied to osteons. Collagen and mucopolysaccharides percentages are significantly lower in longitudinal rather than alternate osteons. In fact, alternate osteons contain more collagen and mucopolysaccharides than longitudinal osteons at equal degrees of calcification, because alternate osteons contain transverse lamellae, which are richer than longitudinal lamellae in collagen and mucopolysaccharides. According to the invention, the mucopolysaccharides percentage decrease, as the degree of calcification increases, is statistically significant in alternate osteons. Conversely, the mucopolysaccharide percentage decrease will not be statistically significant, as the degree of calcification increases, in longitudinal osteons. In either case, the mucopolysaccharide percentage decreases in osteons, regardless of the osteon type, when the degree of calcification increases. Here, the resulting collagen and mucopolysaccharides percentages for longitudinal (alternate, respectively) osteon samples is lower (higher, respectively) than the values found by Pugliarello et al., 1970) regardless of the osteon type. The means of collagen and mucopolysaccharide percentages are combined with the mean number of longitudinal and transverse lamellae in longitudinal and alternate osteons to yield the mean percent of collagen and mucopolysaccharides within longitudinal and transverse lamellae, at initial and final stages of calcification. These percentages are not previously reported in the literature.

According to the invention, the biochemical analysis shows a statistically significant higher percent of collagen and mucopolysaccharides in alternate rather than in longitudinal osteon samples at equal stages of calcification; a statistically significant higher percent of collagen and mucopolysaccharides in transverse rather than in longitudinal lamellae at equal stages of calcification; and a statistically significant (not significant, respectively) decreasing amount of collagen and mucopolysaccharides as the degree of calcification increases in alternate (longitudinal, respectively) osteon types.

Mathematical Modeling

Mathematical modeling will consist of analysis of the experimental diagrams to establish yield strength, ultimate strength, moduli and constitutive equations; and the realization of a computerized geometric-structural model, which will simulate the behavior of the microscopic components so as to include fracture propagation during loading.

Analysis of Experimental Diagrams

The observation of the experimental diagrams assesses the yield strength and ultimate strength. For each experimental diagram, the constitutive equation, which relates stress, strain and their time dependencies, is established in terms of the Ramberg-Osgood equation:

$$\theta = Tc(d\theta/dt)^d + a\ T^N(d\theta/dt)^b$$

where $\theta$ and $T$ denote angle-of-twist and torque respectively; a, b, c, d, N denote constant values that depend on the material properties, with a, b, c $\geq$ 0 and d $\leq$ 0.

Such equations have accurately modeled the response set at various strain rates of a wide range of tested engineering materials (Ramberg and Osgood, 1943). This is because the geometric shape of the experimental diagrams changes only moderately as the strain rate varies; and the Ramberg-Osgood equation is a simply formulated polynomial whose coefficients are functions of the strain rate, which describes the relatively simple geometric shape of the experimental diagrams, i.e. an increasing function graph, that passes through the origin and is concave down.

The determination of the constants a, b, c, d and N will follow the procedure used by Hight and Brandeau (1983) for macroscopic compact bone samples. The Ramberg-Osgood equation is expected to suffice to produce a good fit (measured by an $r^2$ of 0.98–0.99) because the osteon viscoelastic behavior is expected to be less complex than that of macroscopic samples. If desired, increasingly more complex differential equations are employed, starting with more complex polynomials and rational functions of T whose coefficients depend on the strain rate.

Linear-viscosity is expected (Frasca et al., 1977) at least for physiological strains, which for the outer wall of the tibia (as one example) are of the order of between 0.0007 and 0.0020, at physiological strain rates, which are of the order of between 0.0135 and 0.5143 Hz. If linear-viscosity is present and the Ramberg-Osgood equation provides a good fit, the coefficients a, b, c, N equal 0, 1, 0, 0, respectively.

The approximating function of each experimental diagram will serve to compute: the viscoelastic modulus as the derivative of the diagram approximating function at zero strain and the energy absorption capacity as the area under the approximating curve.

Statistical Analysis

The Two Way Analysis of Variance is applied to the means of viscoelastic modulus, yield strength, ultimate strength and energy absorption with osteon type (longitudinal or alternate) and degree of calcification (initial or final) as factors for each strain rate. If normality is lacking, the 2-way ANOVA is applied to the means of the logarithms. Significance is set at 0.05. The Post hoc Student-Newman-Keuls test identifies the significant factors. This test yields significant differences in the following:

1. Viscoelastic modulus, yield strength, ultimate strength, and energy absorption capacity should be higher at the final stages rather than at the initial stages of calcification, regardless of the osteon type and the strain rates
2. Viscoelastic modulus, yield strength, ultimate strength, and energy absorption capacity should be higher for longitudinal rather than alternate osteon samples, regardless of the degree of calcification and the strain rate.
3. Viscoelastic modulus, yield strength, ultimate strength, and energy absorption capacity should be higher for longitudinal rather than alternate osteon samples, regardless of the degree of calcification and the strain rate;
4. Viscoelastic modulus, yield strength, ultimate strength, and energy absorption capacity should show a smaller increase in value for longitudinal rather than alternate osteon samples, as the strain rate increases, regardless of the degree of calcification.
5. Viscoelastic modulus, yield strength, ultimate strength, and energy absorption capacity should increase with increasing strain rate, regardless of the osteon type and the degree of calcification.

In certain embodiments of the model, if desired, yield strength is not determined.

Viscoelastic Osteon Model

The purpose of the viscoelastic osteon model is to relate the mechanical behavior of the osteon sample to the behavior of the ultrastructural components that causes a progressive loss of stiffness. The micromechanical behavior is described in terms of micro-cracking, de-bonding, void growth and components breakage. The lesions observed under an optical microscope in osteon samples subjected to dynamic torsional loading at various strain rates serves to develop osteon models and to formulate biological hypotheses on propagation of fractures. In a preferred embodiment, this longitudinal osteon model is an extension (so as to include components' viscoelastic properties) of the elastic model in Ascenzi M.-G. (2000); whereas the alternate osteon model is prepared ex novo. The osteon model is based on the experimental diagrams' approximating functions, angle-of twist as function of torque; the hypotheses on ultrastructural components' behavior under dynamic torsional loading formulated from the experimental diagrams; the ultrastructural components' percents, as obtained from the biochemical analysis; and the ultrastructural components' viscoelastic properties.

Figure 5:
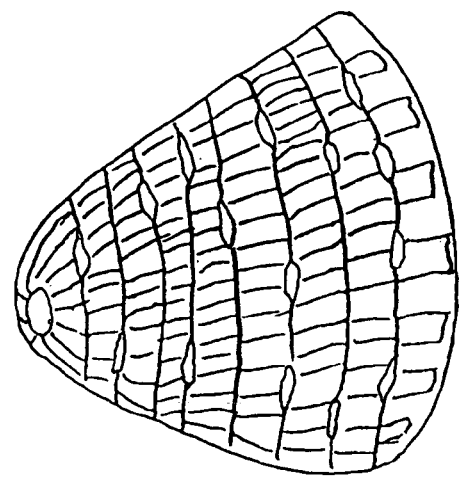
FIG. 5. Diagram of a segment of osteon in cross-linking illustrating the arrangement of canaliculae and lacunae relatively to lamellae (based on FIGS. 4–11 of Leeson et al. (1985)).

The geometric model of each of the longitudinal and alternate osteon samples before mechanical testing consists of a hollow cylinder with coaxial lateral surfaces. Its internal diameter, external diameter, and height equal 40 µm, 210 µm, and 500 µm, respectively. Each such hollow cylinder presents pores, as shown in FIG. 5. Pores in the model will include the vascular canal, canaliculae and lacunae and equal 20% of the total osteon volume (Piekarski, 1970).

Figure 6A:
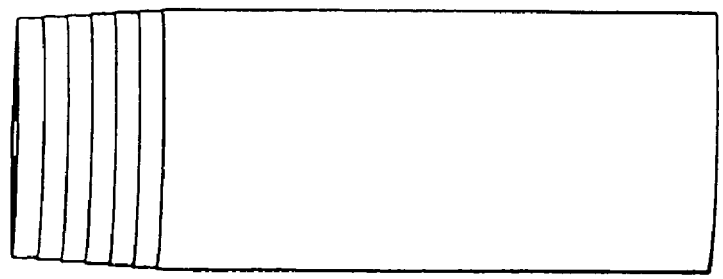
FIGS. 6A and 6B. (A) Material model consisting of fiber-reinforced unidirectional laminae. The first few external laminae are partially pulled out to show arrangement. (B) On a small laminar element of constant thickness, the principal material axes are labeled 1, 2, and 3. Direction 1 is parallel, and direction 2 perpendicular, to the fibers. Direction 3 is the radial direction, perpendicular to the plane of the diagram. Circumferential and axial directions are labeled θ and z. The angle between the circumferential direction and direction 1 is denoted γ.
Figure 6B:
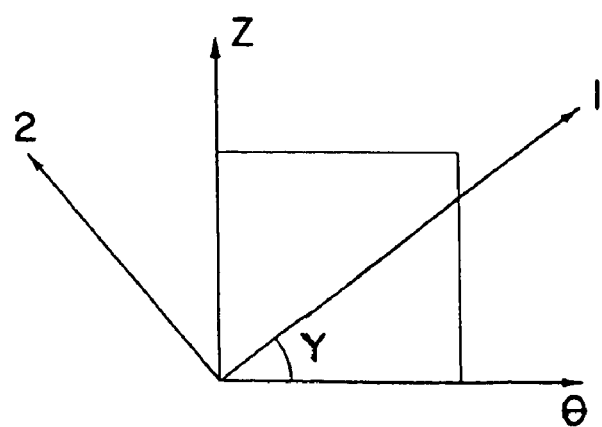
Figure 8:
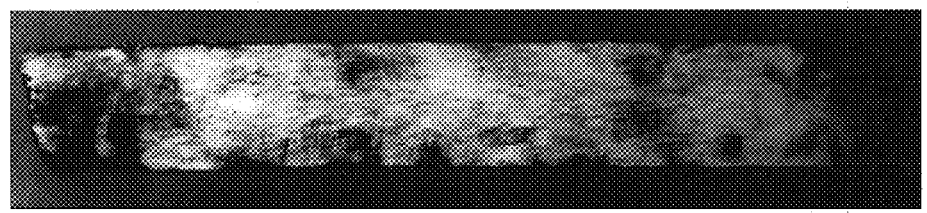
FIG. 8. Isolated and flattened bright lamellar specimen rotated at 45° to the polarizing plane. Collagen bundles run parallel to its length. Lamellar width is approximately 70 microns.
Figure 9:
FIG. 9. Isolated and flattened bright lamellar specimen rotated at 0° to the polarizing plane. Collagen bundles run parallel to its length. Lamellar width is approximately 70 microns.

The material model of each of the longitudinal and alternate osteon samples before mechanical testing consists of a laminate whose length, width, and height correspond to cylindrical shell circumference, thickness, and height, respectively (FIG. 6A). The layers are unidirectional fiber-reinforced laminae of the same matrix and fibers. The matrix and fibers are each treated as homogeneous and isotropic. The matrix is considered as elastoplastic and the fibers as viscoelastoplastic. The fibers are assumed to be circular in cross-section and randomly distributed in the transverse plane. The lamina with fiber inclination γ is named γ-lamina (FIG. 6B). There are two types of fibers. The first fiber type, with a diameter of 800 Å, represents collagen. The second fiber type, with a smaller diameter, represents mucopolysaccharides. The matrix occupies up to 40% of the lamina volume without voids (Bonfield and Li, 1967), at the highest degree of calcification. The relative percentages of matrix at the initial stages of calcification and of the two fiber types at initial and final stages of calcification, and the diameter of the second type fibers is based on the biochemical analysis.

The elastic properties of the matrix are seen to model the elastic properties of hydroxyapatite (Katz and Ukraincik, 1971). The viscoelastic properties of the fibers of the first type are seen to model the viscoelastic properties of collagen (Currey, 1959; Haut, 1983). The viscoelastic properties of the fibers of the second type are seen to model the unknown viscoelastic properties of mucopolysaccharides. Little information is available regarding the fluids within the pores incorporated in the microstructure. Initially, the proposed model simplifies or disregards the structural effects of the fluid within these pores with assignments of minimal material property values. This form of the model is exercised parametrically to include fluid within the pores, with various bulk moduli.

The longitudinal osteon model consists of 12 laminae 7.08 µm thick. It is described by the sequence (82, −82) repeated 6 times (Frasca et al., 1977). The alternate osteon model consists of 36 laminae. The fiber inclination angle increases by 20.50 from −82° to 82° and then decreases by 20.5° from 82° and −82° four consecutive times. Here the ±82-laminae are 7.08 µm thick while the other laminae are 1.01 µm thick. Because the sequence (−61.5, −41, −20.5, 0, 20.5, 41, 61.5) models a 7.08 µm thick transverse lamella, transverse and longitudinal lamellar models have the same thickness. Transverse lamella is subjected to a strain associated with prestress (Ascenzi and Benvenuti, 1980), as described in Ascenzi M.-G., 1998a and 1999b. Longitudinal lamellar model is 9.45 µm thick and transverse lamellar model is 5.40 µm thick (e.g., Gebhardt, 1906; Marotti, 1993; Ascenzi A. et al., 2001). The matrix volume is 10% higher in the longitudinal lamellar model than it is in the transverse lamellar model (Marotti et al., 1994).

Fracture Propagation Modeling

To model fracture propagation in osteons, each of the longitudinal and alternate osteon models is divided into a discrete number of elements. The starting number can be 618,137. The element mesh is refined to achieve convergence of the solution. Then a computer program, based on Montecarlo simulation, is written to perform the following tasks:

1. For any given value of torque applied to experimental samples, the distribution of stress in the osteon model is computed. Such computation will take into account voids.
2. Such stress distribution will be added to the distribution of prestress.
3. The strain associated to the resulting stress will be computed on each phase within each element.
4. From the strain associated to the resulting stress, the overall deformation of the hollow cylindrical shell will be computed.
5. From the strain in each phase within each element, the phase deformation will be computed.
6. The strain in each phase within each element is compared to the yield strain.
7. The strain is chosen as the criterion for osteon failure (Piekarski, 1970). The maximum strain, called critical strain, after which fracture occurs within each phase, is provided by the literature. A failure criterion (e.g., Von Mises) will be included if cracks appear to initiate at the matrix-fiber interface.
8. The elastic properties of fractured phases will be computed by means of formulas of type $E_i = E_e/(1+(1+v_e)(k_e\lambda)/2)$ (Gupta and Bergström, 1998).
9. The elements are assumed to be aligned in independent rows such that the problem of fracture propagation becomes one-dimensional.
10. To model the progressive growth of damage, the torque will be increased incrementally, and using the fracture criterion above, the number of failure elements will be established.
11. The increased probability of fracture in the neighborhood of an already fractured element will be considered using the concept of stress enhancement factors.
12. If all elements on one row are broken, the strain level at which all elements on one row are broken is taken as the failure strain for that row. The process is repeated for each row in the model. Once the maximum torque is reached, the program stops.
13. At this point, the simulation of fracture propagation is completed.
14. The fractures obtained in this way in the model should check with those observed in osteon samples.

Verification of the Model

Entities computed from the experimental diagrams are correlated, such as stiffness degradation and fracture propagation, to verify the osteon model. The osteon model (loaded quasi-statically) should behave like the osteon sample (loaded quasi-statically).

The influence of factor pertaining to the following ultrastructural components and voids are also considered:

Large strains, which may be accommodated by the organic phase, contribute to the dissipation of energy at the front of a propagating crack. Crack propagation appears to be arrested in the presence of canaliculae and lacunae. In the case where the crack enters a discontinuity, its front is blunted, hence reducing the stress concentration factor and slowing crack propagation. When a crack is forced to enter a vascular canal, the radius at the tip of the crack becomes larger. Lacunae are probably more likely to act as stress concentrators than canaliculae because of the ellipsoidal cross-section and because they are generally oriented normal to the long axis. However, their much smaller size precludes them from acting as fracture initiators until or unless plastic deformation has created cracks at the tip and thereby extended them to the critical length for spontaneous fracture. It seems unlikely that smaller discontinuities could act as stress concentrators. It may be that discontinuities "to some extent increase the robustness of bone" (Currey, 1962) rather than increase its tendency for brittle fracture. No cross-lamellar or cross-osteonal cracks are observed in macroscopic samples.

Examination of Model Results

In both osteon types, a fracture starts at a weaker point of the bone structure (Carter et al., 1981) at the weak interfaces between two outer lamellae (e.g. Piekarski, 1970; Simkin and Robin, 1974). That outer lamellae are involved in the fracture process is tentatively explained by the hydroxyapatite decrease in osteons from vascular canal to outer wall (Rho et al., 1999).

In longitudinal osteons, the fracture starts somewhat longitudinally, between collagen bundles. It then deviates once or twice at the beginning of the fracture and is soon followed by a smooth crack advancing rapidly across the osteon to possibly end in the vascular canal. As torque increases, collagen bundles between cracks break, and cracks join to create one or more long almost vertical cracks. Deviations causing a dentate profile may be due to the viscoelastic, strain rate sensitive mucopolysaccharides and perhaps collagen. Such dentate profile should therefore be more evident at low (rather than) high strain rate and at the initial stages of calcification when the osteons are richer in mucopolysaccharides. In alternate osteons, cracks are expected to spread obliquely by following the weak interfaces of lamellae. The transverse and oblique collagen bundles may break before the longitudinal ones as the osteon section enlarges. Cracks spread through lamellae less rapidly than in longitudinal osteons as explained by the crack propagation control, characteristic of composite materials (Cook and Gordon, 1964). Once the crack breaks through transverse and oblique bundles, it will propagate faster straight through the vascular canal. A long crack should show an oblique orientation between upper and lower extremities. In alternate osteons at initial stages of calcification the cracks may start at a higher value of torque and propagate more slowly than at the final stages of calcification if the percent of mucopolysaccharides is higher.

It follows that at the same degree of calcification, a longitudinal osteon is weaker in longitudinal than in transverse shearing while an alternate osteon is weaker in tension than in shear (confirmed by Ascenzi A. et al., 1967 and 1972). This is because when a torque is applied to a body, tensile and compressive stresses are produced on the lateral surface, and torsional shearing stresses are produced on the cross-section of the body. The tensile and compressive stresses act approximately at a 45° angle to the long axis of the body. The direction of the shearing stress on the cross-section of the body is the same as that of the force producing torsion. If a material is weaker in longitudinal than in transverse shearing, the first cracks arise from axial shearing stresses and appear in a longitudinal direction. However, if the material is weaker in tension than in shear, it usually cracks along a spiral course inclined at a 45° angle to the long axis of the body. This is because a state of pure shear is equivalent to a state of tension in one direction and of compression in the opposite direction (Timoshenko and Young, 1940). The tension stress produces a spiral crack in the body.

For both osteon types, 3 to 4 small cracks form in the hydroxyapatite and collagen, which yields and pulls and/or buckles and makes the cracks spread within lamellae. Microcracks form ahead of the advancing fracture line.

The slow propagation of cracks in the areas containing transverse and oblique collagen bundles allows for the area to absorb a large amount of energy. Slow propagation is essentially a pull-out type mechanism, that is, hydroxyapatite crystallites are pulled out of the collagen by shear failure at the fiber-matrix interface. The rapid propagation of cracks in areas containing approximately vertical collagen bundles allows very low energy absorption. This should be compatible with larger areas under the experimental graphs of alternate osteons.

Hydroxyapatite crystallites are pulled out from collagen around canaliculae.

At low strain rates in compression, distortion of the lamellar structures occurs (McElhaney and Byars, 1965).

The propagating crack generally has the tendency to avoid discontinuities (Piekarsky, 1970), hence increasing its length. Discontinuities act as crack arresters by blunting the tip of the crack, which enters them.

The osteon model agrees with fractures observed in osteon samples after loading. The dimensions of the hollow cylindrical model after dynamic torsional loading matches the means of the osteon samples' dimensions measured experimentally.

The sudden shift of the osteon shape from a circular to a square cross-section suggests a stress concentration at the lugs. Therefore, fractures can begin at the end of some samples earlier during loading than would otherwise be expected.

Advantages of the Model

The model of the invention advantageously simplifies osteon structure, in particular with respect to exclusion of partially calcified collagen bundles. The shape and dimensions of hydroxyapatite crystallites and the relationship of these parameters to the organic components of the matrix are only partially known. Not all the collagen bundles are completely calcified. Those that are not calcified take up crystallites only on 400 Å bands (Ascenzi A. et al., 1965). Hence such bundles may be comprised of relatively more stiff 400 Å bands separated by relatively more flexible decalcified collagen segments. This model does not contain fibers that model such partially calcified collagen bundles. Here the fiber of the first type model uncalcified collagen bundles, the fiber of the second type model the mucopolysaccharides and the matrix, which models the hydroxyapatite crystals, lies outside both fiber types.

Example 3

Properties of Osteons under Dynamic Loading

The experiments reported here examine the properties of osteons under dynamic loading. They focus on viscoelasticity, characterizing first how viscoelasticity depends on collagen bundle direction and hydroxyapatite density, and second how the relative percentages of collagen and mucopolysaccharides depend on collagen bundle direction and hydroxyapatite density. These experimental results therefore provide important information on the role that the ultrastructural constituents play in the viscoelastic behavior of the osteon. By describing the limits and extent of the role that the osteon ultrastructure plays in determining osteon viscoelasticity, a better understanding is gained of how bone tissue absorbs energy during dynamic loading and of how fractures propagate.

Furthermore, these experiments can show that longitudinal and alternate osteons show a linearly-viscous behavior in the physiological strain range. Such a showing would be of fundamental importance in the understanding of the non-linear viscous behavior hypothesized by Lakes and Katz (1979a and b) on macroscopic bone specimens. In fact, it would point to the cement lines, which are more ductile than osteons, as responsible for the non-linear effect.

Thus, the aim of these studies was three-fold: to evidence single osteon viscoelasticity, subject of the described mechanical experiments; to evidence elementary component differences in osteon lamellae, subject of the described chemical experiments; and to identify additional osteon geometric and structural variables in order to clarify long standing questions and provide a meaningful link among the proposed experimental results.

For the four experiments described below, the bone material consisted of adult human femoral shafts (27–49 years old), free from evident skeletal faults, and removed from cadavers in accordance with US regulations. The selected age range corresponds to the young age group of Kuo et al. (1998).

Mechanical Evidence of Osteon Viscous Behavior

Osteon specimens were subjected to twist and hold testing. All specimens showed viscous behavior as evidenced by relaxation. The result points to the appropriateness of dynamic loading of osteon specimens to investigate osteon viscoelasticity.

Methods. The Ascenzi A. et al. (1994) methodology was used to obtain 6 osteon specimens. A femoral shaft was first sawn into 30 mm long longitudinal segments by means of a rotating-saw microtome with a continuous watering system to provide lubrication and prevent the material from overheating. The segments were then sliced into longitudinal slabs 350 μm thick, i.e. slightly thicker than an osteon. Micro-X-rays of these longitudinal sections were prepared to allow identification (Amprino and Engström, 1952) of fully calcified osteons, as desired for this study. Both the section and the micro-X-ray were then scanned for a 500 μm long portion of fully calcified osteon around a straight haversian canal of the required diameter (in this study, averaging 40±3 μm) that was free of Volkmann's canals. The identified specimen was then isolated in a two-step procedure. During the first step, a dental drill secured to a microscope stage cut a coarse parallelepiped around the specimen. During the second step, a CECOM Company micro-grinding lathe machined the 500 μm long central portion of the coarse parallelepiped to the shape of a cylinder that contained the haversian canal. The external diameter of this cylinder is set to measure 210±3 μm. After grinding, the concentricity of the canal was assessed by checking the distance between canal and external cylindrical surface of the specimen at various rotational angles and levels. A canals that deviated more than ±10 μm at any point along its length with respect to the axis of the cylinder was deemed unacceptable for use. From a classical mechanics approach this is sufficient to ensure that the specimen's torsional stiffness (rigidity) does not vary by more than 5% due simply to structural anomalies.

The relative dimensions of the osteon specimens reflect conditions determined by the distinctive nature of bone microstructure. In particular, (i) 500 μm is the maximum length compatible with the avoidance of Volkmann's canals in the wall of the specimen that would behave as discontinuities; and (ii) an external diameter of 210 μm ensures that the central portion of the osteon is isolated and that therefore portions of the neighboring structures are not included in the specimen to avoid irregularities in the osteon specimen thickness. FIG. 7b shows a completely isolated osteon specimen with lugs, necessary to attach the specimen firmly to the loading device. Inspection under an optical microscope checks the specimen for small surface defects that could alter the shear modulus values in torsional testing.

The axisymmetric cylindrical shape of the osteon specimen lends itself well to torsional loading. At the level of a single osteon the specimen unit appears homogeneous and isotropic by observation. To determine elastic constants by mechanical testing methods, many techniques are available. The cylindrical nature of the specimens lends itself ideally to torsional testing. This loading method is used to determine the material stiffness (shear modulus in this case) and is not intended to simulate in vivo loading conditions experienced on the intact bone during activities of daily life. This method of loading is appropriate and sufficient for the determination of one of the two elastic constants that completely define the mechanical behavior of these specimens as a whole, as isotropic specimens. Extensive experience in the application of this technique for intact long bone specimens is advantageous.

The apparatus used is described in Ascenzi A. et al. (1994), to test osteon specimens under quasi-static torsional loading to failure. Weights are attached to a thin light thread (FIG. 2) to load the osteon specimen in torsion. An optical method measures the angle through which one end of the specimen twists relative to the other during testing. Although the resulting torque vs angle-of-twist diagrams are independent of the direction of loading, all the loadings were initiated in the counterclockwise direction. Every 11 seconds a 0.1 gram weight was attached to the end of the thread, up to a total of eight weights. The total number of weights was indicated by the fact that the 0.8 gram loading with this device corresponds to a torque between elastic limit and ultimate strength during quasi-static experiments (Ascenzi A. et al., 1994). For each specimen, the angle of twist corresponding to the 8 weights was recorded after 20 seconds and again after another 40 minutes had elapsed.

Results. All six specimens showed a non zero angle-of-twist change (see table below) with a mean of 1.6°. A non zero angular deflection points to tissue relaxation and reveals the viscous behavior.

TABLE 2

Osteon Angle-of Twist Change

| Specimen No. | 1 | 2 | 3 | 4 | 5 | 6 |
|---|---|---|---|---|---|---|
| Angular Deflection (degrees) | 0.38 | 1.50 | 0.75 | 2.42 | 1.50 | 2.76 |

Thickness Variation within Dark and Bright Lamellae

The thickness of the wet outer lamellae of alternate osteons was measured along their two ends, separately, on thin transverse sections. Dark and bright lamellae show thickness variation between the two ends. The result points to the appropriateness of thickness measurements on osteon specimens for both mechanical and chemical investigations.

Methods. Transverse section thickness was set at 70 μm. Polarizing light allowed the identification of alternate osteons. Micro-X-ray allowed identification of required osteon degree of calcification (Amprino and Engstrom, 1952), set to final in this preliminary study. Lamellar thickness was measured at 5 points on each of the two ends of 86 dark and 66 bright peripheral lamellar specimens embedded in wet alternate osteons by Delta Sistemi IAS 2000 image analysis system. The following table shows means and standard deviations (in microns).

TABLE 3

| | Lamellar Thickness | | |
|---|---|---|---|
| Specimen | Thickness On End 1 | Thickness On End 2 | Thickness Difference |
| Dark | 4.27 ± 1.00 | 4.85 ± 0.96 | 0.29 ± 0.26 |
| Bright | 7.62 ± 1.91 | 8.58 ± 1.99 | 0.48 ± 0.47 |

Differences between bright and dark lamellae were significant ($p<0.05$). Both dark and bright lamellar thickness varies from lamella to lamella and within any given lamella along the osteon length as previously observed by Ascenzi A. et al. (1982) on isolated bright lamellae.

Thickness Variation between Wet and Dry Lamellar Conditions

Dry and wet lamellar thicknesses were measured within the osteon samples. Whether dry or wet, dark lamellae are thicker than bright lamellae and bright lamellae expand with water to a lesser degree than the dark lamellae. The result points to the appropriateness of biochemical analysis to quantify the mucopolysaccharides in longitudinal and alternate osteons.

Methods. The rotating-saw microtome described above was employed to cut transverse sections. A micro-X-ray of each cross section was prepared to allow identification (Amprino and Engstrom, 1952) of required degree of osteon calcification, set to final in this study. Lamellar thickness and width were measured at 5 points on each of 20 dark and 20 bright peripheral lamellar specimens in dry alternate osteon specimens by using a Delta Sistemi IAS 2000 image analysis system, and again after wetting with a micro-pipette. On each lamella, all measurements were taken consistently on one of the two transverse ends. Only thinner dark lamellae were used for comparison with bright lamellae because dark lamellae are in general thicker than bright ones (see e.g. Marotti et al., 1994), whether dry or wet. The mean length (±S.D.) of the whole alternate osteon equaled 70.30±9.28 μm and 72.45±9.58 μm, under dry and wet conditions, respectively. This table shows means and standard deviations (in microns) on which the student t-test was run with significance set at 0.05.

TABLE 4

| | Lamellar Thickness | |
|---|---|---|
| Specimen | Thickness Dry | Thickness Wet |
| Dark | 4.13 ± 1.23 | 4.10 ± 1.10 |
| Bright | 3.30 ± 0.88 | 3.56 ± 0.93 |

Whether dry or wet, bright lamellae are significantly thinner than dark lamellae when enclosed in alternate osteons. Additionally, wet and dry conditions affect bright and dark lamellar thickness differently. Bright lamellae are significantly less thick when dry than wet. In contrast, dark lamellae thickness does not change significantly whether wet or dry. The bright lamellar thickness increase from dry to wet supports the hypothesis that bright lamellae contain a higher quota of mucopolysaccharides, which tend to expand with moisture, and that the bright collagen bundles (see sections 4.5–4.7) in the bright lamella tightly encircling dark lamella impede expansion. The length of the whole osteon is significantly less when dry.

Isolation of Dark and Bright Lamellar Specimens

The invention provides a new technique, which allows isolation of both dark and bright lamellar specimens. Previously, Ascenzi A. et al. (1982) isolated specimens of dark lamellae by a technique that cannot be applied to bright lamellae. Here, two lamellar types are examined and compared through and across their flatten cylindrical surface. Lamellar collagen bundle orientations and hydroxyapatite patterns were observed by means of three different methodologies (Ascenzi M.-G. and Ascenzi A., 2002; Ascenzi M.-G. et al., 2002). These are: circularly polarizing microscopy, confocal microscopy, and the X-ray diffraction. Confocal microscopy and small-angle X-ray diffraction were employed for the first time on lamellar specimens. The three methodologies yield well-matched results even though the oblique collagen bundles of dark lamellae observed under polarizing light were not observed by the other two methods.

Method. The rotating-saw microtome described was employed to cut longitudinal segments approximately 30 mm long from the femoral mid-shaft. The segments were then sliced in thin (70–100 μm) transverse sections of desired thickness. A micro-X-ray of each section was prepared to allow identification (Amprino and Engström, 1952) of required osteon degree of calcification. Fully calcified osteons were selected for this study. On the section, a trapezoid was cut with the dental drill described above around each chosen alternate osteon specimen (FIG. 3). For osteon immobilization during lamellar isolation, a portion of the bone material inside the trapezoid away from the osteon was glued to a slide. The dark and bright lamellae at the periphery of each osteon were dissected wet with a razor-sharp microtome blade, obtained by filing a steel needle. Because it is necessary to hold the bone during isolation, the whole lamella with exclusion of a little tract was isolated. In some instances, to improve the microscopic examination of particular aspects of the collagen layers of the free surfaces, specimens of both lamellar types were delicately scratched with the needle for micro-dissection. To avoid fracture formation during straightening of each lamellar specimen, the operation is performed gently on wet specimens while under direct visualization with an optical microscope. The selection of external lamellae, of lesser curvature than internal lamellae, decreases the risk of fracture formation during flattening. The difficulty of applying this free-hand micro-dissection to obtain regularly dissected and discontinuity-free specimens is evidenced by the fact that approximately only 1 out 3 specimens successfully complete the procedure.

Circularly Polarizing Light Microscopy on Dark and Bright Lamellae

Dark (bright, respectively) specimens are composed of longitudinal (transverse, respectively) and oblique up to ±45° collagen bundle orientations.

Method. 102 dark and 110 bright lamellar specimens were examined with a Laborlux Leitz equipped for polarizing light. A Zeiss laser scan microscope equipped with argon ion and helium-neon lasers was used to locate the structures of interest and to obtain digital images, respectively. These last were archived on a hard disk and subsequently transferred to a film. To increase the digital image fluorescence, structures of interest were stained with a diluted solution of eosin. For result verification, a few 1–2 μm thick section were cut at a slight angle with respect to the transverse plane from decalcified bone embedded in paraffin. The lamellae appeared better separated than in the cross-section and consequently better resolved optically. After staining with eosin the sections were observed under a fluorescent microscope.

Figure 10:
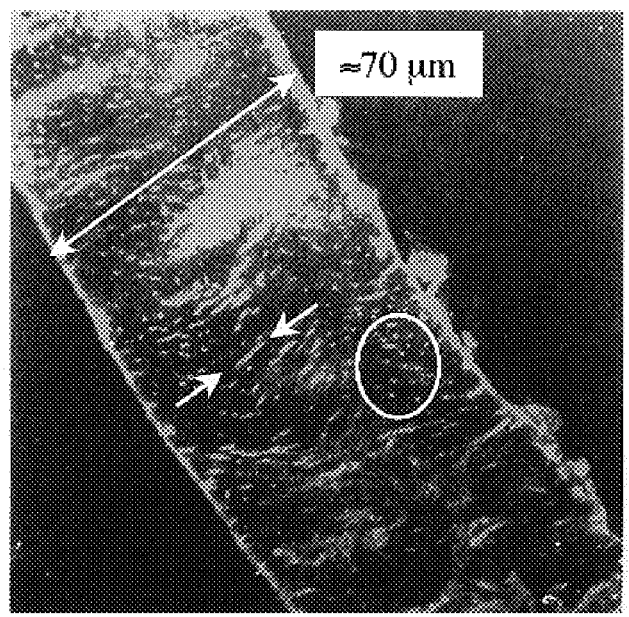
FIG. 10. Confocal microscopy detail of isolated and flattened dark lamella. Opposed arrows show the orientation of a collagen bundle arrangement perpendicular to the lamella edge. Cut radial collagen bundles appear as dots within the circle.
Figure 11:
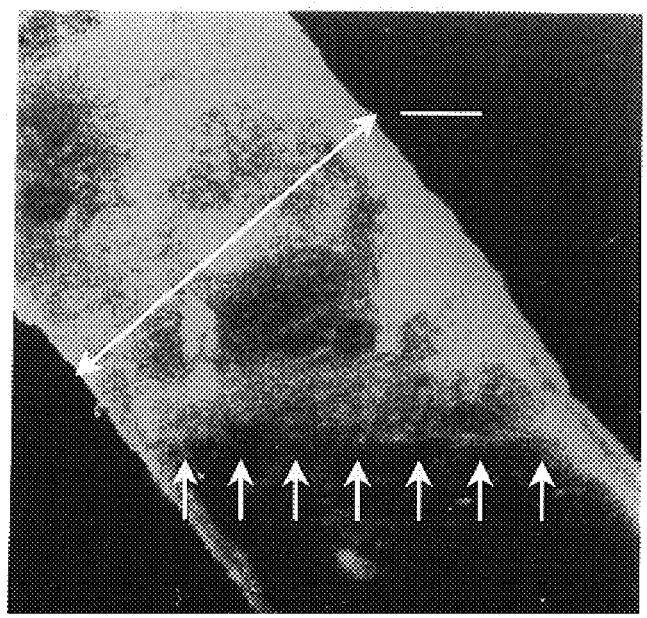
FIG. 11. Detail of isolated and flattened bright lamellar sample as viewed by confocal microscopy. Arrows indicate oblique bundles extending across the lamella thickness.

Results. When a wet lamellar specimen is observed through its flattened cylindrical surface under a polarizing microscope, its features change in relation to the lamellar orientation with respect to the polarizing planes of the two Nicol's prisms. When the long edge of the dark lamellar specimen is oriented at 45° (0°, respectively) with the polarizing plane, collagen bundles run perpendicularly (obliquely at ±45°, respectively) to the long edge of the specimen. When the long edge of a bright lamellar specimen is oriented at 45° (0°, respectively) with the polarizing plane, collagen bundles run parallel (obliquely at ±45°, respectively) to the long edge of the specimen (FIGS. 10 and 11). The distribution of the collagen bundles appears homogeneously distributed except at some points of the oblique bundle distribution. Such discontinuities may really exist or be due to artificial removal of bundles during dissection or be due to optical elision of superimposed orthogonal bundles. Collagen bundles reveal intermediate orientations at intermediate orientations of the lamellar specimen with the polarizing plane.

Confocal Microscopy on Dark and Bright Lamellae

Dark (bright, respectively) specimens are composed of longitudinal (transverse and oblique at approximately ±45°, respectively) collagen bundle orientations. Collagen bundles that follow the osteocyte process are observed to run across layers of longitudinal collagen bundles. Confocal microscopy allowed observation of collagen orientations without overlap and of the ground substance between unidirectional areas of collagen bundles. Observation of collagen bundle direction and proximity points to the appropriateness of a biochemical analysis to quantify collagen and mucopolysaccharides in longitudinal and alternate osteons. Observations of collagen bundle direction provide information on the osteon structure. According to the invention, oblique collagen bundles of dark lamellae are observed by confocal microscopy or by polarizing microscopy.

Methods. 3 dark and 3 bright lamellar specimens were isolated as described in section 4.4 from nominal 70 μm thick transverse section. Square areas of up to 50×50 μm were scanned wet every 1 μm in the thickness direction by a Leitz confocal microscope. Since the natural fluorescence of wet bone worked well with the confocal microscope, no staining of the specimen was necessary. The photomultipliers detect light intensity and not color; red was chosen to be applied to the image.

Results. The dark lamellar specimens show a regular arrangement of collagen bundles (FIG. 10). From one border to the other, the collagen bundles are parallel to the osteon axis. Each dot is the cut radial collagen bundle that follows the osteocyte process. On bright lamellar specimens, transverse and oblique collagen bundles were evidenced with more space between bundles than in dark lamellae (FIG. 11). Such finding suggests a lower concentration of collagen. The confocal microscope allows discrimination of unidirectional areas of collagen bundles of various directions. This observation appears to be new, not elsewhere reported in the literature. The observation of collagen longitudinal and transverse bundle directions confirms Gebhardt's model. The bright lamellar specimens show ample areas of ground substance between collagen bundles, parallel and oblique to the flat lamellar borders. The larger areas of ground substance suggest a higher concentration of mucopolysaccharides in bright rather than dark lamellae. These findings support the hypothesis that, at the same degree of calcification, alternate osteons contain a greater concentration of mucopolysaccharides than longitudinal osteons. Whether the low amount (less than 1%) of mucopolysaccharides will show a significant difference between osteon types at the same degree of calcification, as predictedremains to be determined, e.g., through observation of dark lamellae by confocal microscopy.

X-ray Diffraction on Dark and Bright Lamellae

Lamellar specimens which appear dark and bright, respectively, in cross-sections were investigated by Small- and Wide-Angle X-ray diffraction (SAXS and WAXS, respectively) for collagen and hydroxyapatite crystallite pattern orientations. Collagen bundle orientations and hydroxyapatite patterns differ between dark and bright lamellae and follow analogous patterns within the same lamellar type. These results further support Gebhardt's model. Such observations provide information on the osteon structural variables underlying the computerized osteon specimen model.

Methods. Thirteen fully calcified dark and 13 bright lamellar specimens were isolated and flattened, as described above, from 70 μm thick transverse sections. The dental drill with water cooling allowed preparation of 2 radial hemisections and 2 transverse sections. This investigation was designed to check the hypothesis of collagen and hydroxyapatite pattern differences between dark and bright lamellae. SAXS and WAXS lend themselves well to such studies because SAXS is indicative of collagen orientation through the "staining" of the collagen bundles by the hydroxyapatite crystallites while the WAXS is indicative of hydroxyapatite pattern orientation (but not the orientation of single crystals). The direction of the incident beam was chosen parallel (at 45°, respectively) to the lamellar width in dark (bright, respectively) lamellae to investigate patterns parallel (oblique at approximately ±45°, respectively) to the osteon axis (FIG. 12).

SAXS and WAXS diffraction patterns were recorded using the scanning diffractometry setup of the ID 13 microfocus beamline of the European Synchrotron Radiation Facility (Grenoble, France). The beam wavelength of 0.964 Å was obtained with a Si(111) monochromator and focused to 7 μm (full-width at half-maximum) by a glass capillary. The sample was scanned through the beam by a computer controlled x/y gantry. Intact scales, as well as portions of scales were mounted on a goniometric head, with the surface of the scale orthogonal to the X-ray beam. Square areas of up to 50×50 μm were scanned with spatial resolutions of 5 μm and 10 μm. Diffraction patterns were recorded while moving the sample along the horizontal and vertical axes. Also, some horizontal and vertical linear scans were performed with spatial resolutions from 5 to 20 μm. Small and wide angle patterns were recorded sequentially on the same area by changing the sample-to-detector distance. The diffraction patterns were recorded with a MARR CCD detector with exposure times of 10 and 30 sec for wide and small angle respectively. The detector features are: 2048×2048 pixels, 64.45 μm×64.45 μm; 16 bit readout. The thin radial hemisections and transverse sections of fully calcified alternate osteons were investigated at various angles with respect to the incident beam used for verification of results.

Figure 14:
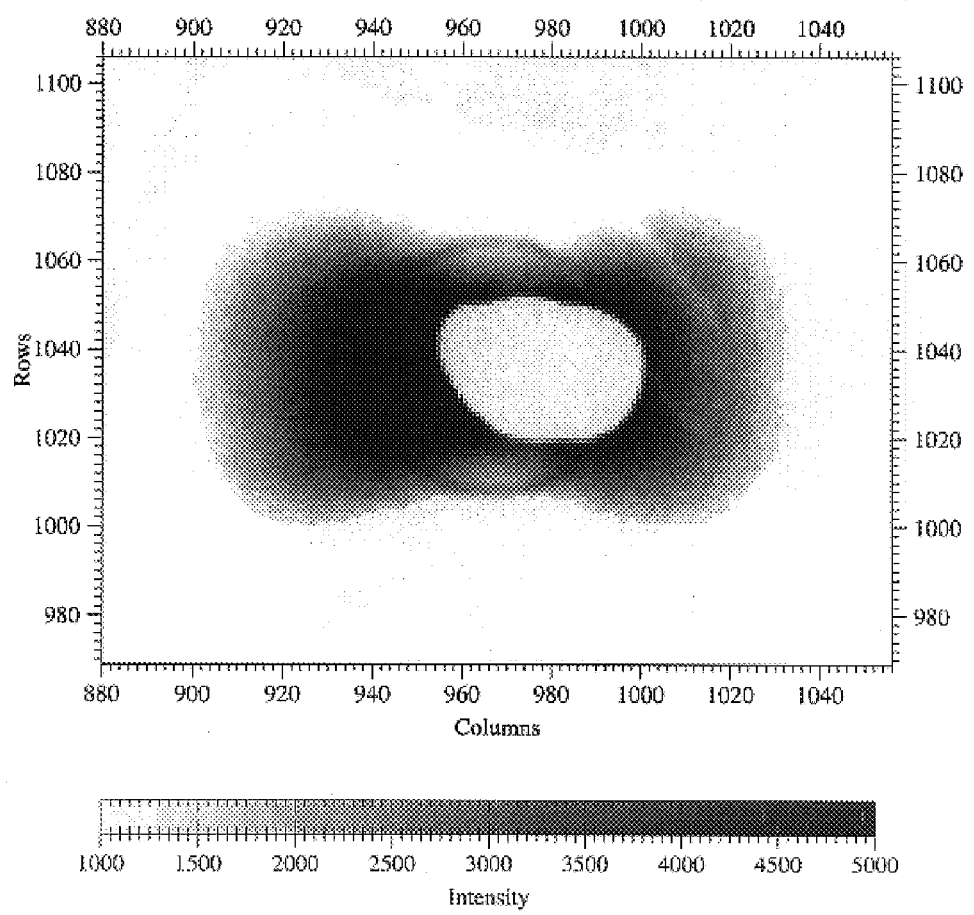
FIG. 14. Enlargement of one SAXS image from FIG. 9. Clear arching and maximum intensity orientations show single preferential collagen bundle direction perpendicular to bright lamellar width.

Results. A first examination of the experimental images shows the following. The SAXS images of dark lamellae are unchanged in shape within scanned areas, evidencing one preferential orientation of collagen bundles (FIG. 13). A clear arching of the small-angle meridional reflection, which corresponds to the third-order collagen periodicity, is indicative of collagen orientation with respect to the osteon axis. The arching shows no change within and across the scanned areas with intensity preferentially distributed in one direction, indicating a single preferential collagen bundle direction. Moreover, the position of the maximum intensity oriented perpendicularly to the bright lamellar width and the arching of the small-angle meridional reflection parallel to the bright lamellar width are indicative of collagen bundle orientation parallel to the osteon axis (FIG. 14).

Figure 15:
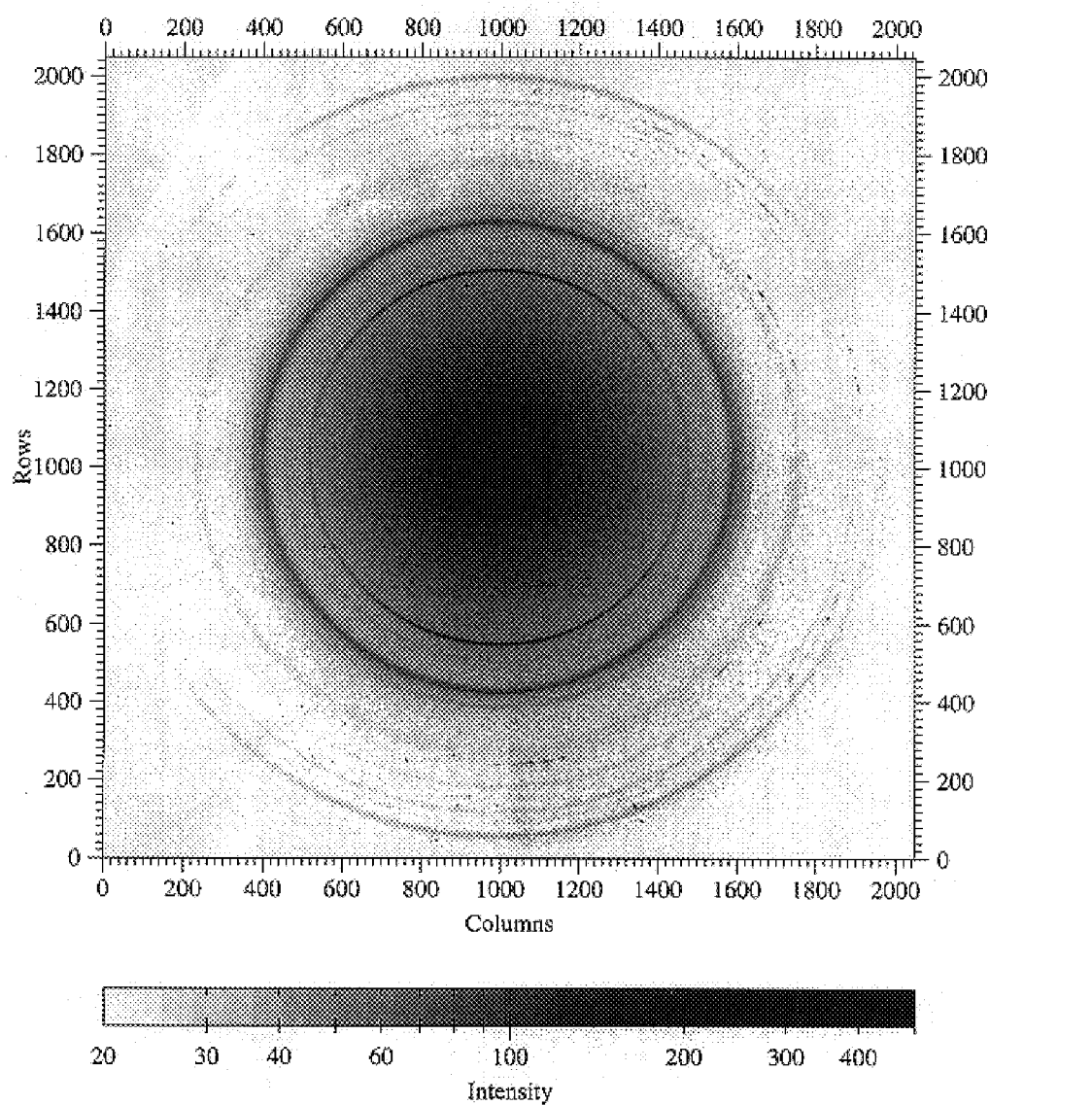
FIG. 15. WAXS image of the scanned location of the FIG. 10 SAXS image. Clear preferential orientation of the 002 reflection parallel to the dark lamella width shows single preferential collagen bundle direction perpendicular to bright lamellar width.
Figure 16:
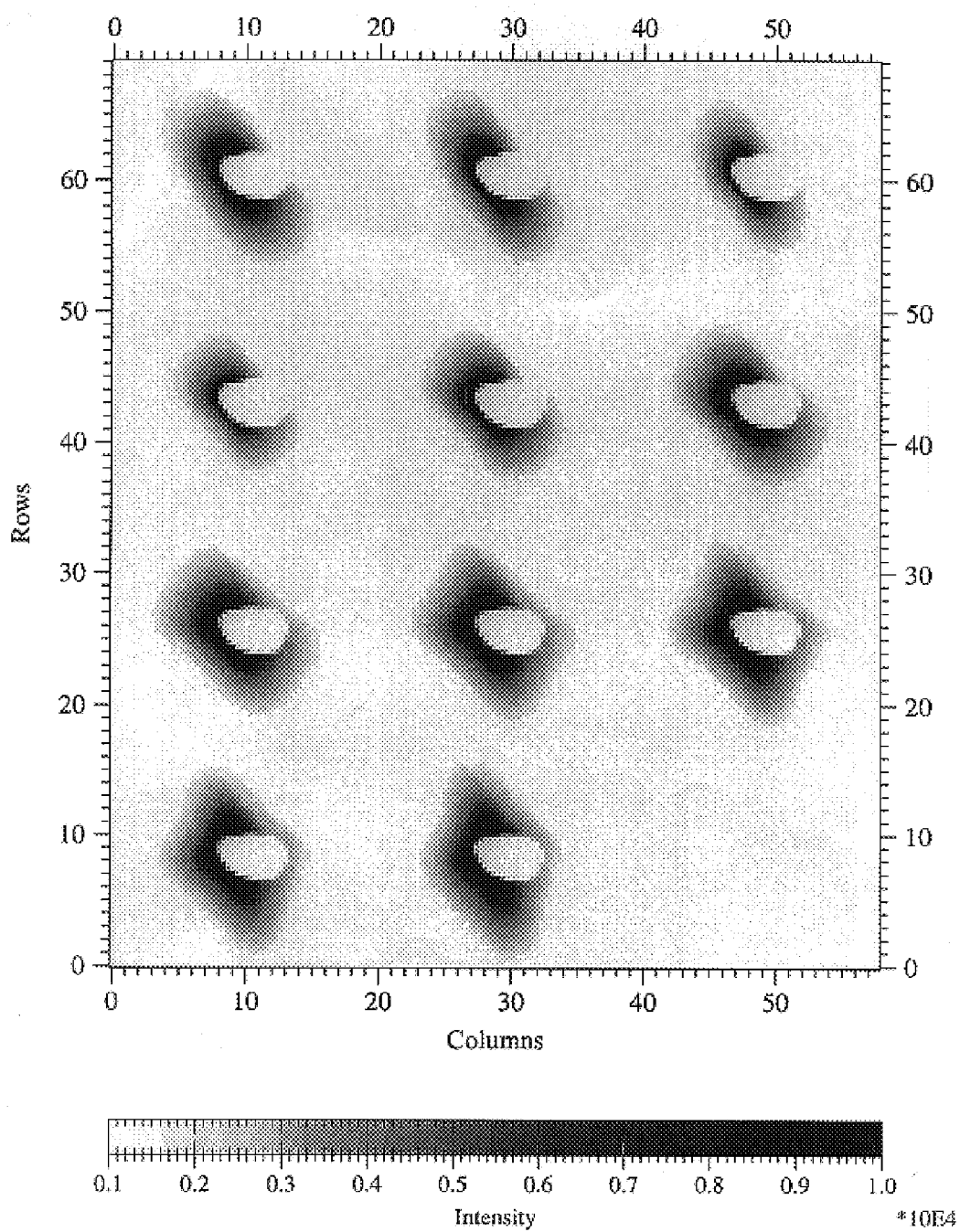
FIG. 16. SAXS image of dark lamella from a scanned area. The images change across the scanned locations.
Figure 17:
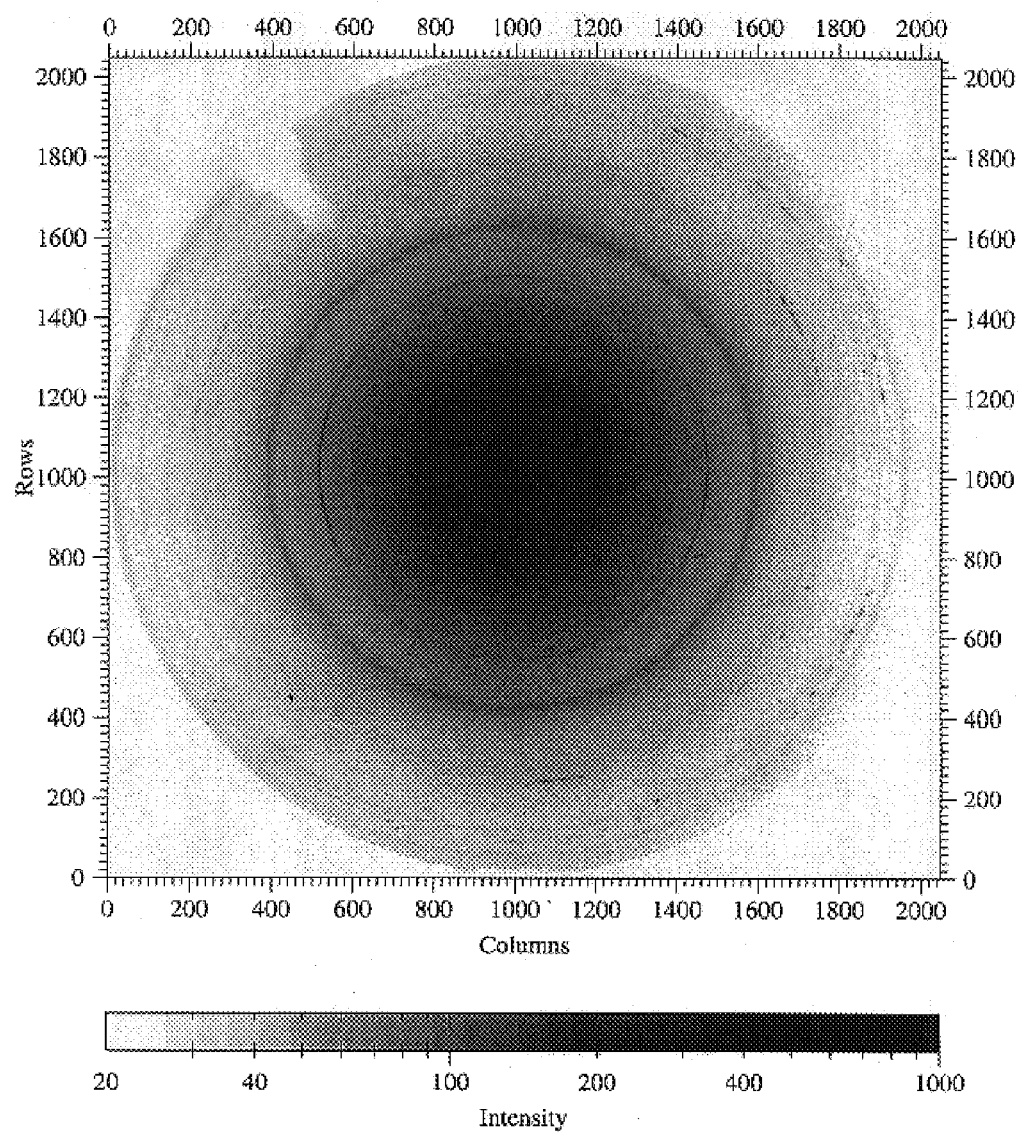
FIG. 17. WAXS image of a bright lamella scanned location, which shows lack of preferential orientation of the 002 reflection.

The WAXS images of dark lamellae show a consistent preferential orientation of the 002 reflection parallel to the bright lamellar width, which indicates one preferential orientation of hydroxyapatite patterns along the osteon axis (FIG. 15). In contrast, the SAXS images of bright lamellae change in shape (intensity and inclination) within scanned areas, evidencing one or two preferential orientations of collagen bundles at ±45° lamellar width direction (FIG. 16). Therefore, bright lamellae contain areas with oblique collagen bundles, at approximately ±45° with the osteon axis. The arching of the SAXS meridional reflection is unclear on bright lamellar specimens. It is therefore indicative of a lack of specific collagen orientation. The WAXS images on bright lamellae show a preferential orientation of the 002 reflection at 45° with respect to the lamellar width direction in only some areas (FIG. 17). This indicates the local presence of hydroxyapatite orientation oblique to the osteon axis. The lack of consistent preferential orientation of hydroxyapatite patterns suggests a higher directional disorder in comparison with dark lamellae. Note the consistency of the results for collagen bundles and hydroxyapatite patterns, which support the similarity of patterns between collagen and hydroxyapatite. Experimental images are currently being examined for differences in hydroxyapatite density between the two lamellar types.

Example 4

Computerized Geometric/Structural Osteon Model

Similar to Example 2, this Example provides a viscoelastic model for osteons based on modeling of experimental data. Osteon specimens are prepared for subjection to dynamic torsional loading and biochemical analysis. Such tests yield viscoelastic properties and the relative percentages of collagen and mucopolysaccharides. The results obtained forms the basis for a computerized geometric/structural osteon model, that simulates the formation and propagation of fractures observed in the loaded specimens. The study is described by the following flow chart:

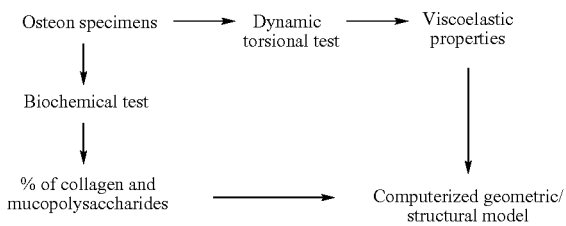

Osteon Specimen Preparation and Selection

Because of the rigorous criteria for the selection of osteon specimens (such as the haversian canal and specimen cylindrical surface being coaxial), only about 1 out of 25 specimens isolated may be eligible for mechanical testing.

For mechanical and chemical experiments, the bone material specifications and specimen preparation techniques are conducted according to the specification. Initial and final stages of calcification, as evidenced by micro-X-ray (Amprino and Engström, 1952), are chosen for the longitudinal and alternate osteon specimens. The type, whether longitudinal or alternate, of the specimen can be assessed only after loading by observation under polarized light a thin cross-section cut from the specimen with the dental drill. In fact, because the thickness of the transverse bone section is slightly larger than the osteon mean diameter, concentric lamellae overlap, thereby reducing or precluding the visibility of dark lamellae, and leaving open the possibility that an alternate osteon may have a bright appearance. The osteon types can be identified after mechanical testing by cutting a 100 μm cross section with the dental drill and examining it under polarizing light. Therefore, for the mechanical investigation proposed, it is necessary to prepare between 2,700 and 3,000 specimens to obtain 120 specimens (30 osteon specimens per osteon type at initial and final stages of calcification) which will satisfactorily complete the procedures adopted for loading under torsion at low and high strain rates.

For the biochemical analysis, specimens with the same geometric and structural characteristics are prepared. The procedure is considerably more expeditious but requires more specimens. The specimens for biochemical analysis are isolated from 500 μm thick transverse sections using the technique of Ascenzi A. and Bonucci (1968). In this technique, no lugs are necessary and the type of a 500 μm long osteon specimen can be easily recognized on transverse sections (FIG. 1A). Osteons, whose canal of 40±3 μm runs perpendicular to the transverse section, are measured before isolation in terms of thickness of bright and dark lamellae on both sides of the section (see section entitled "Thickness Variation Within Dark and Bright Lamellae"). The number of bright and dark lamellae is counted at both sides of the section by the imaging system. Osteons whose distributions in terms of thickness and number of bright and dark lamellae match those of mechanically tested osteon specimens are selected for isolation. The dental drill is used to isolate cylindrical osteons specimens with a 210±3 μm outer diameter by cutting with an off-center tip along a circle. In fact, when the rotating axis of the needle is perpendicular to bone section surfaces, i.e. its axis coincides with the osteon axis, the tip of the needle cuts an osteon specimen of cylindrical shape with walls of uniform thickness. After isolation, the length and diameter of each specimen is checked by means of an eyepiece micrometer. Further, the Haversian canal is cleaned out by inserting a metal rod slightly (45 μm, approximately) thicker than the Haversian canal. It is necessary to isolate approximately 100 osteon specimens (FIG. 4) per osteon type at initial and final stages of calcification to have sufficient material volume for each of the two biochemical analyses.

Because of the different technical requirements of the mechanical testing and the biochemical analyses, the test specimens for each come from separately prepared groups of osteon specimens. The two groups consists of osteon specimens isolated from each region of the same mid-diaphyseal section of the femur in the same proportion. The strictness of the criteria for specimen selection and preparation ensures homogeneity between the two specimen groups.

Mechanical Testing

Once osteon specimens are prepared as described above, wet osteon specimens are tested under monotonic torsional loading. A micro-torsimeter as described above is employed, using direct visualization of the specimen with a stereo microscope during the loading sequence. The osteon specimens are loaded until rupture at constant low ($10^{-2}$) and high ($10$ sec$^{-1}$) strain rates.

For the proposed experiments the torsimeter is modified for attachment to an MTS 612 servohydraulic testing machine. The fixed stock of the torsimeter incorporates a reaction torque sensor (5 oz-in capacity). The drive shaft is modified to incorporate a bowstring arrangement to convert the linear actuator displacement to angle of twist. The base of the torsimeter is rigidly mounted to centralize the actuator axis with the bowstring arrangement. Ramp loadings of $10^{-2}$ mm/sec and 10 mm/sec is used to apply torque to the specimens. All the specimens are taken to failure.

The resulting output is a plot of torque versus angle-of-twist recorded in real time. A direct dependency of the torque's slope versus angle-of-twist curves is observed on the loading rate (see also previous Examples demonstrating a significant creep effect). The experimental diagrams are graphs of increasing functions of the angle-of-twist, which show a concave downward shape, regardless of the osteon type and the degree of calcification. From considerations on dynamic behavior and osteon collagen make-up, the diagrams are steeper and less concave for the high (rather than low) strain rate, independently of osteon type and degree of calcification; for low strain rate (rather than the quasi-static condition of Ascenzi A. et al., 1994), independently from the osteon type at the final degree of calcification; for the osteon specimens at the final (rather than initial) degree of calcification, independently of osteon type, for any fixed strain rate; and for the longitudinal (rather than alternate) osteon specimens, independently of degree of calcification, for any fixed strain rate.

After the mechanical testing, osteon specimens are examined under an optical microscope under both regular and fluorescent light (Huja et al., 1999) to assess fracture patterns. At low strain rates, a distortion of the lamellar structures in the areas under compression is observed (McElhaney and Byars, 1965). No cross-lamellar or cross-osteonal cracks occur because they have not been observed in macroscopic specimens. That outer lamellae are involved in the fracture process is tentatively explained by the decrease in hydroxyapatite present in the osteons as one proceeds from the vascular canal to the outer wall (Rho et al., 1999). In both osteon types the fracture agrees with the observations of Jepsen et al. (1999) that fracture in macroscopic specimens is ductile and that fracture alters bone's viscous behavior. In particular, relaxation increases with the increasing extent of fractures. Consequently, viscous effects in osteon specimens can increase with the increasing extent of fracture. The transition of the shape of our osteon specimens from a circular to a square cross-section suggests a stress concentration effect at the junction of the cylindrical portion with the rectangular lugs situated at the ends. Therefore, fractures can begin at the end of some specimens earlier during loading than would otherwise be expected.

Further, at a fixed strain rate, longitudinal and alternate osteons differ with respect to fracture patterns. This results from the following combination of general considerations on torque with previous results on osteons. On one hand, application of torque to a body can be viewed as internal tensile and compressive stresses using ajudicious choice of material element orientation. The tensile and compressive stresses act approximately at a 45° angle to the longitudinal axis of the body. If a material is weaker in a longitudinal orientation than in transverse shearing, the first cracks arise from axial shearing stresses and appear in a longitudinal direction. However, if the material is weaker in tension than in shear, it usually cracks along a spiral course inclined at a 45° angle to the long axis of the body (Timoshenko and Young, 1940). On the other hand, Ascenzi A. et al. (1967 and 1972) found that at the same degree of calcification longitudinal osteons are weaker in longitudinal than in transverse shearing, while alternate osteons are weaker in tension than in shear. Therefore, in longitudinal osteons the fracture is expected to start somewhat longitudinally, between collagen bundles. Therefore, it can deviate once or twice at the beginning of the fracture and be soon followed by a smooth crack advancing rapidly across the osteon to possibly end in the vascular canal. As torque increases, collagen bundles between cracks are expected to break and cracks coalesce to create one or more predominantly longitudinal cracks. Deviations causing a dentate profile may form due to the viscoelastic, strain rate sensitive collagen and mucopolysaccharides. Such a dentate profile is therefore be more evident at low (rather than) high strain rate and at the initial stages of calcification when the osteons are richer in mucopolysaccharides. In alternate osteons, cracks spread obliquely by following the weak interfaces of lamellae. The transverse and oblique collagen bundles may break before the longitudinal ones as the osteon section enlarges. In this instance, cracks spread through lamellae less rapidly than in longitudinal osteons, as explained by the crack propagation control, characteristic of composite materials (Cook and Gordon, 1964). Once the crack breaks through transverse and oblique bundles, it propagates faster straight through the vascular canal. A long crack shows an oblique orientation between upper and lower extremities. In alternate osteons at initial stages of calcification the cracks may start at a higher value of torque and propagate more slowly than at the final stages of calcification if the percent of mucopolysaccharides is higher.

After observation of fracture patterns, the specimens are measured in length and diameter. After lug removal, the alternate osteons are sectioned and examined to assess the collagen bundle arrangements. At that point, longitudinal and alternate osteon specimens only are included in the investigation. The dark and bright lamellae of longitudinal and alternate osteons are counted and measured in thickness under polarizing light. Such values are comparable to the ones obtained by Ardizzoni (2001) by a different method. The knowledge of number and thickness of lamellae within mechanically tested specimens is necessary to prepare for the biochemical analysis sets of specimens with same distributions of lamellae.

Biochemical Analysis

A portion of the osteon specimens, prepared and selected as described above are subjected to chemical analysis. Spectroscopic techniques and video microscopy are used to study intermolecular interactions in phase transitions. These spectroscopic techniques, coupled with chromatographic separations, are critical in the biochemical analyses. Collagen (as hydroxyproline) and mucopolysaccharides (as hexosamine) is assessed on 150 µg amounts of longitudinal and alternate osteons at initial and final stages of calcification. While it is difficult to quantify small quantities precisely, the uncertainty does not affect the comparative conclusions to be made (Herring, 1972).

Osteon specimens are dried to constant weight in a vacuum desiccator over $P_2O_5$. Since decalcification of osteons is necessary to quantify hexosamine and hydroxyproline, acid hydrolysis is used. Residual HCl is removed before the assays are performed. Hydrolysis products are separated using refined chromatographic techniques as first described by Exley (1957). Hexosamine is determined spectroscopically essentially according to the procedure of Elson and Morgan, (Exley 1957) as modified by Oguchi et al. (1979). The methodology is refined to eliminate the possibility of interference from amino acids and mineral salts (Pugliarello et al., 1970). Hydroxyproline is determined, essentially according to the procedure of Serafini-Cessi and Cessi (1965), as later refined by Teerlink et al. (1989).

The biochemical analysis has been performed successfully (Pugliarello et al., 1970) on osteon specimens at initial and final stages of calcification, without regard to osteon type. Moro et al. (2000) have employed on rat bone a technique refinement that can be applied to osteons. Collagen and mucopolysaccharides percentages are significantly lower in longitudinal rather than alternate osteons. In fact, alternate osteons contain more collagen and mucopolysaccharides than longitudinal osteons at equal degrees of calcification, because alternate osteons contain bright lamellae, which are richer than dark lamellae in collagen and mucopolysaccharides. The mucopolysaccharides percentage decrease, as the degree of calcification increases, is statistically significant (non significant, respectively) in alternate (longitudinal, respectively) osteons. In fact, mucopolysaccharide percentage needs to decrease in osteons, regardless of the osteon type, for the degree of calcification to increase. The resulting collagen and mucopolysaccharides percentages for longitudinal (alternate, respectively) osteon specimens is lower (higher, respectively) than the values found by Pugliarello et al., 1970) regardless of the osteon type. The means of collagen and mucopolysaccharides percentages is combined with the mean number of dark and bright lamellae in longitudinal and alternate osteons to yield the mean percent of collagen and mucopolysaccharides within dark and bright lamellae, at initial and final stages of calcification.

The Two Way Analysis of Variance is applied to the means of the collagen and mucopolysaccharides with osteon type (longitudinal or alternate) and degree of calcification (initial or final) as factors. If normality lacks, the 2-way ANOVA is applied to the means of the logarithms. Significance is set at 0.05. The Post hoc Student-Newman-Keuls test identifies the significant factors. The biochemical analysis shows: a statistically significant higher percent of collagen and mucopolysaccharides in alternate rather than in longitudinal osteon specimens at equal stages of calcification; a statistically significant higher percent of collagen and mucopolysaccharides in bright rather than in dark lamellae at equal stages of calcification; and a statistically significant (not significant, respectively) decreasing amount of collagen and mucopolysaccharides as the degree of calcification increases in alternate (longitudinal, respectively) osteon types.

Any discrepancies or unexpected results may be of two types. Either an expected difference is an actual no difference or the difference is reversed. The actual results are examined in relation to the observed mechanical behavior through the computerized model, which is implemented with the actual chemical percentages. For instance, an actual no difference result of an elementary component percentage between two specimen group can mean that such elementary component does not contribute to a difference in mechanical behavior between such groups.

Analysis of Mechanical Diagrams

The observation of the experimental diagrams assesses elastic modulus and the ultimate strength. For each experimental diagram, the constitutive equation, which relates stress, strain and their time dependencies, is established in terms of the Ramberg-Osgood equation:

$$\theta = Tc\left(\frac{d\theta}{dt}\right)^a + aT^N\left(\frac{d\theta}{dt}\right)^b$$

where $\theta$ and T denote angle-of-twist and torque respectively; a, b, c, d, N denote constant values that depend on the material properties, with a, b, $c \geq 0$ and $d \leq 0$. This equation has accurately fitted the response set at various strain rates of a wide range of tested engineering materials (Hight and Brandeau, 1983). This is because on one hand the geometric shape of the experimental diagrams changes only moderately as the strain rate varies. On the other hand, the Ramberg-Osgood equation is a simply formulated polynomial whose coefficients are functions of the strain rate, which describes the relatively simple geometric shape of the experimental diagrams, i.e. an increasing function graph, that passes through the origin and is concave down.

The determination of the constants a, b, c, d and N follows the procedure used by Hight and Brandeau (1983) for macroscopic compact bone specimens. The Ramberg-Osgood equation suffices to produce a good fit (measured by an $r^2$ of 0.98–0.99) because the viscoelastic behavior of a single isolated osteon specimen is less complex than that of macroscopic specimens. In cases where the Ramberg-Osgood equation does not produce a good fit, increasingly more complex differential equations can be employed, starting with more complex polynomials and rational functions of T whose coefficients depend on the strain rate. Linear-viscosity is obtained (Frasca et al., 1977) at least for physiological strains. If the Ramberg-Osgood equation provides a good fit and linear-viscosity is present, the coefficients a, b, c, N equal 0, 1, 0, 0, respectively. The approximating function of each experimental diagram serves to compute the viscoelastic modulus as the derivative of the diagram approximating function at zero strain and the energy absorption capacity as the area under the approximating curve.

The 2-way ANOVA is applied to the means of the elastic and viscoelastic moduli, ultimate strength and energy absorption with osteon type (longitudinal or alternate) and degree of calcification (initial or final) as factors for each strain rate. If normality lacks, the 2-way ANOVA is applied to the means of the logarithms. Significance is set at 0.05. The Post hoc Student-Newman-Keuls test identifies the significant factors. Significant differences are obtained in elastic and viscoelastic moduli, ultimate strength, and energy absorption capacity with regard to the following: higher values at the final stages rather than at the initial stages of calcification, regardless of osteon type and the strain rates; higher values for longitudinal rather than alternate osteon specimens, regardless of degree of calcification and the strain rate; higher values for longitudinal rather than alternate osteon specimens, regardless of degree of calcification and the strain rate; smaller increase in value for longitudinal rather than alternate osteon specimens, as the strain rate increases, regardless of degree of calcification; and increase in values with increasing strain rate, regardless of osteon type and degree of calcification.

Geometric/Structural Osteon Specimen Model

The osteon specimen model fits the mechanical behavior of the osteon specimen to that of its ultrastructural components. Therefore, the model is based on the mechanical diagrams' approximating functions, angle-of twist as function of torque, and the relative percentages of the ultrastructural constituents, as obtained from the biochemical analysis. This osteon specimen computerized model allows for the concomitant incorporation of elementary component percentages and orientations, and their role during visco-elastic and plastic phases. The model allows for simulation of the fracture propagation observed in the mechanically tested specimens. In particular, the model sheds light as to the processes within the osteon specimen of micro-cracking, de-bonding, pore growth and components' breakage, which result in fracture patterns.

The model's crucial parameters are assessed from the specimens employed for mechanical and chemical analysis. Other important parameters, i.e. collagen bundle and hydroxyapatite pattern directions and bright lamellar prestress, have been investigated in large numbers (on the order of a few hundreds so as to cover the biological variability of osteon structures). Additional parameters, i.e. dimensions and distribution of canaliculae and lacunae, viscoelastic properties of collagen and mucopolysaccharides, collagen bundle diameter, and elastic properties and density of hydroxyapatite have not been assessed in specimens and are addressed by treating them as parameters which vary, within ranges consistent with lamellar structures, around available values from the literature. The ranging of such additional parameters accordingly serves to model different scenarios.

Material science implies that some of these parameters of a fiber reinforced laminated model have a role (perhaps minor) in the modeled comparative behavior of the two osteon types. For instance, the presence, relative distribution and density of canaliculae and lacunae affects the fracture simulation patterns, rather than the particular dimension or position of a canalicula or lacuna. Accordingly, the parametrized model of the invention allows for different values of the parameters, either exclusion of canaliculae and lacunae altogether or variation in porosity distribution. Since there is no evidence of difference in the literature between osteon types with respect to viscoelastic properties of collagen and mucopolysaccharides, and elastic properties of hydroxyapatite, their parametric values are kept constant across the two osteon model. Such parametric values are less relevant because of the comparative nature of the model. The starting parametric values of the hydroxyapatite density follow any relevant findings from a complete examination of X-diffraction results and indications from the literature. The initial parameter value for collagen bundle diameter measurement may be obtained from the literature and is kept constant across the osteon types.

The geometric model of the osteon specimens before mechanical testing consists of a hollow cylinder with coaxial lateral surfaces. Its internal diameter, external diameter, and height equal 40 μm, 210 μm, and 500 μm, respectively. Each such hollow cylinder presents pores, as shown in FIG. 5. Pores in the model will include haversian canal, canaliculae and lacunae, and the starting parametric value of the total osteon volume (Piekarski, 1970) is set equal to 20%.

The material model of each of the longitudinal and alternate osteon specimens before mechanical testing consists of a laminate whose length, width, and height correspond to the cylinder circumference, thickness, and height, respectively (FIG. 6). The layers are unidirectional fiber-reinforced laminae. The matrix represents a mixture of hydroxyapatite and mucopolysaccharides. The fibers represent collagen. The three materials that make up matrix and fibers are each treated as homogeneous and isotropic. Both matrix and fibers are considered as viscoelastoplastic. The fibers are assumed to be circular in cross-section and randomly distributed in the transverse plane. The longitudinal and alternate osteon models consist of laminae whose number and thickness will equal the mean of the lamellar number and thickness of the tested specimens. The lamina with fiber inclination γ is named γ-lamina. The values of γ will follow the results of the studies described above, so as to include and exclude, respectively, oblique fibers in the laminae modeling dark lamellae. The initial parametric value for the fiber (modeling collagen) diameter is set at 800 Å. The relative percentages of collagen and mucopolysaccharides at initial and final stages of calcification, is quantified by the biochemical analysis. The initial parametric percentage of hydroxyapatite at the highest degree of calcification is set to 40% of the lamina volume without pores (Bonfield and Li, 1967). The initial parametric hydroxyapatite volume is set 10% higher in the dark lamellar than in the bright lamellar model (Marotti et al., 1994). The initial parametric values that describe the elastic properties of the hydroxyapatite equal the findings of Katz and Ukraincik (1971). The initial parametric values that describe the viscoelastic properties of the fibers, which model collagen, equal the findings of Currey (1959) and Haut (1983). No information is available in the literature in reference to the viscoelastic properties of mucopolysaccharides. Viscoelastic parametric values are deduced from similar substances. Little information is available regarding the fluids within the pores incorporated in the microstructure. Initially, the model, by assignments of minimal material property values, disregards the structural effects of the fluid within these pores. This form of the model is then be exercised parametrically to include fluid within the pores with various bulk moduli.

The starting number of elements for the Finite Element Analysis is in the order of 618,137. This was computed by the use of brick elements of dimensions averaging 3 μm to have elements comparable to lacunae in volume. The element mesh is refined to achieve convergence of the solution. For any given value of the experimental torque, a computer program based on Montecarlo simulation is written to compute stress, strain, and phase deformation distributions. Since strain is chosen as the criterion for osteon fracture (Piekarski, 1970), the strain within each element is compared to the yield strain provided by the literature. If cracks appear to initiate at the matrix-fiber interface, an appropriate failure criterion (e.g., Von Mises, Tresca) is included. The increased probability of fracture in the neighborhood of an already fractured element is considered using the concept of stress enhancement factors. The model is verified by checking that the osteon model simulates the osteon quasi-static behavior (Ascenzi A. et al., 1994) and the specimens' dynamic fracture patterns.

The model can evidence the following experimental observations on fracture propagation by various authors. Fractures start at a weaker point of the bone structure (Carter et al., 1981). 3 to 4 small cracks form in the organic phase which yields and/or buckles and in hydroxyapatite, which pulls and makes the cracks spread at the weak interfaces between two outer lamellae (e.g. Piekarski, 1970; Simkin and Robin, 1974). Lacunae' size precludes them from acting as fracture initiators until or unless plastic deformation has created cracks at the tip and thereby extended them to the critical length for spontaneous fracture. At the front of the propagating crack, the large strains, which may be accommodated by the organic phase, contribute to the dissipation of energy. Microcracks form ahead of the advancing fracture line. The areas containing transverse and oblique collagen bundles can show slow propagation of cracks to allow for the area to absorb a large amount of energy. Slow propagation is essentially a pull-out type mechanism, that is, hydroxyapatite crystallites would be pulled out of the collagen by shear failure at the fiber-matrix interface. The rapid propagation of cracks in areas containing approximately vertical collagen bundles would allow for very low energy absorption. This should be compatible with larger areas under the experimental graphs of alternate osteons. The propagating crack avoids discontinuities (Piekarsky, 1970), hence increasing its length. Crack propagation is arrested by the presence of canaliculae and lacunae. In the case where the crack enters a discontinuity, its front is blunted, hence reducing the stress concentration factor and slowing crack propagation. When a crack is forced to enter the vascular canal, the radius at the tip of the crack becomes larger. Lacunae are more likely to act as stress concentrators than canaliculae because of their ellipsoidal cross-section. Since porosity acts as a crack arrester, porosity may contribute to increase bone's robustness (Currey, 1962) rather than increase its tendency for brittle fracture. Hydroxyapatite crystallites can be pulled out from collagen around canaliculae.

The proposed model simplifies the osteon structure; in particular: exclusion of partially calcified collagen bundles (Ascenzi A. et al., 1965) because they are not yet well understood in terms of structure; assumption of no difference in collagen mechanical properties between dark and bright lamellae because no evidence is currently available and material science points to differences in fiber bundle directions as primarily responsible for structural differences; assumption of no difference in dark and bright lamellae, separately, between longitudinal and alternate osteons because there is no evidence of difference and no lamellar isolation technique is available for longitudinal osteons; and assumption of constant lamellar thickness within any given osteon lamellae, for simplicity.

The patents, applications, test methods, and publications mentioned herein are hereby incorporated by reference in their entirety.

Many variations of the present invention will suggest themselves to those skilled in the art in light of the above detailed description. All such obvious variations are within the full intended scope of the appended claims.

BIBLIOGRAPHY

Amprino, R. and Engström, A. (1952) Studies on X-ray absorption and diffraction of bone tissue. Acta Anat, 15, 1–22.

Ardizzoni A. (2001) Osteocyte lacunar size—lamellar thickness relationships in human secondary osteons. Bone, 25, 215.

Ascenzi, A. (1988) The micromechanics versus the macromechanics of cortical bone—A comprehensive presentation. J. Biomech. Eng., 110, 357–363.

Ascenzi, A. and Benvenuti, A., Evidence of a state of initial stress in osteonic lamellae, Acta Orthop. Belg., 46, 580, 1980.

Ascenzi, A. and Bonucci, E. (1964) The ultimate tensile strength of single osteons. Acta Anat., 58, 160–183.

Ascenzi, A. and Bonucci, E. (1967) The tensile properties of single osteons. Anat. Rec., 158, 375–386.

Ascenzi, A. and Bonucci, E. (1968) The compressive properties of single osteons. Anat. Rec., 161, 377–392.

Ascenzi, A. and Bonucci, E. (1972) The shearing properties of single osteons. Anat. Rec., 172, 499–510.

Ascenzi, A., Ascenzi M. G., Benvenuti, A., and Mango, F. (1997) Pinching in longitudinal and alternate osteons during cyclic loading. J. Biomechanics, 30, 689–695.

Ascenzi, A., Ascenzi, M.-G., and Benvenuti, A. (in preparation, 2001) The revisited osteon.

Ascenzi, A., Baschieri P., and Benvenuti, A. (1990) The bending properties of single osteons. J. Biornech., 23, 763771.

Ascenzi, A., Baschieri P., and Benvenuti, A. (1994) The torsional properties of single selected osteons. J. Biomech., 27, 875–884.

Ascenzi, A., Benvenuti, A., and Bonucci, E. (1982) The tensile properties of single osteonic lamellae: technical problems and preliminary results. J. Biomech., 15, 29.

Ascenzi, A., Benvenuti, A., Bigi, A., Foresti, E., Koch, M. H. J., Mango, F., Ripamonti, A., and Roveri, N. (1998) X-ray diffraction on cyclically loaded osteons. Calc. Tissue Int., 62, 266–273.

Ascenzi, A., Benvenuti, A., Mango, F. and Simili, R. (1985) Mechanical hysteresis loops from single osteons: Technical devices and preliminary results. J. Biomech., 18, 391–398.

Ascenzi, A., Bonucci, E., Bocciarelli, S. (1965) An electron microscope study of osteon calcification. J. Ultr. Research., 12, 287–303.

Ascenzi, A., Boyde, A., Portigliatti-Barbos, M. and Carando, S. (1987a) Micro-biomechanics vs Macrobiomechanics in cortical bone. A micromechanical investigation of femurs deformed by bending. J. Biomech., 20, 1045–1053.

Ascenzi, A., Improta, S., Portigliatti-Barbos, M. and Carando, S. and Boyde, A. (1987b) Distribution of lamellae in human femoral shafts deformed by bending with inferences on mechanical properties. Bone, 8, 319–325.

Ascenzi, M.-G. (1998a) A first estimate of prestress in so-called circularly fibered osteonic lamellae, Abstracts of the 11th conference of the European Society of Biomechanics, J. Biomech., 31, Suppl. 1, 22.

Ascenzi, M.-G. (1999a) Evidence of macroscopic prestress in human femoral shaft, Abstracts of the XV11th conference of the International Society of Biomechanics, Calgary.

Ascenzi, M.-G. (1999b) A first estimation of prestress in so-called circularly fibered osteonic lamellae, J. Biomech., 32, 935.

Ascenzi, M.-G. (2000) Cyclic torsional loading of longitudinal and alternate osteons. National Science Foundation grant n. 0075055.

Ascenzi, M.-G. (2001) Antonio Ascenzi (1915–2000) Calcified Tissue International, 68, 2.

Ascenzi, M.-G. (2001) Antonio Ascenzi (1915–2000), J. Biomechanics, 34, 4.

Ascenzi, M.-G. and Ascenzi A. (2002) Structural examination of isolated osteonic lamellae through and along their flatten cylindrical surface. (In preparation)

Ascenzi, M.-G., Bigi, A. and Panzavolta, S. (2002) X-ray diffraction analysis of osteonic lamellae. (In preparation)

Ascenzi, M.-G. Benvenuti, A., and Ascenzi, A. (2000) Single osteon micromechanical testing. In: Mechanical testing of bone (An Y. and Draughn R. eds), CRC Press, Boca Raton, Fla., 271–290.

Black, J. (1972) Strain related potential in viable human cortical bone. Ph.D. Dissertation, Metallurgy and Materials Science, University of Pennsylvania.

Bloom, W. and Fawcetts D. (1986) A Textbook of Histology. W. B. Saunders, Philadelphia.

Bonfield, W. and Li, C. H. (1967) Anisotropy of nonelastic flow in bone. J. Appl. Phys., 38, 2450–2455.

Boyde, A. and Riggs, C. M. (1990) The quantitative study of the orientation of collagen in compact bone slices. Bone, 11, 35–39.

Boyde, A., Bianco, P., Portigliatti-Barbos, M. and Ascenzi, A. (1984) Collagen Orientation in compact bone: 1. A new method for the determination of the proportion of collagen parallel to the plane of compact bone sections. Metab. Bone Dis. & Rel. Res., 5,299–307.

Butler W. T. (1984) Matrix macromolecules of bone and dentin. Collagen Rel. Res.,4, 297–307.

Carando, S., Portigliatti-Barbos, M., Ascenzi, A. and Boyde, A. (1989) Orientation of collagen in human tibial and fibular shaft and possible correlation with mechanical properties. Bone, 10, 139–142.

Carando, S., Portigliatti-Barbos, M., Ascenzi, A., Riggs, C., and Boyde, A. (1991) Macroscopic shape of, and lamellar distribution within, the upper limb shafts, allowing inferences about mechanical properties. Bone, 12, 265–269.

Carter, D. R., Cater, W. E., Spengler, D. M., and Frankel, V. H. (1981) Fatigue behavior of adult cortical bone: the influence of mean strain and strain range. Acta Orthop. Scand., 52, 481–490.

Cook, J. and Gordon, J. E. (1964) A mechanism for the control of crack propagation in all brittle systems. Proc. R. Soc. Lond., Ser. A, 282, 508–520.

Crolet J.-M., Aoubiza, B. and Meunier, A. (1993) Compact bone: numerical simulation of mechanical characteristics. J. Biomech., 26, 677–687.

Currey, J. D. (1959) Differences in tensile strength of bone of different hystological types. J. Anat., 93, 87–95.

Currey, J. D. (1962) Stress concentrations in bone. Quart. J. Microsc. Sci., 103, 111–113.

Currey, J. D. (1965) Anelasticity in bone and echinoderm skeletons. J. Exp. Biol., 43, 279–292.

Currey, J. D. (1969) The relationship between the stiffness and the mineral content of bone. J. Biomech., 2, 477–480.

Dwoyer et al., Finite Elements—Theory and Application. Springer-Verlag, New York, 1988.

Ebner, V. (v) (1887) Sind die Fibrillen des Knochengewebes verkalktoder nicht? Arch. Mikr. Anat., 29, 213.

Evans, F. G. and Vincentelli, R. (1969) Relation of collagen fiber orientation to some mechanical properties of human cortical bone. J. Biomech., 2, 63–71.

Exley, D. (1957) The determination of 10–100 μmg quantities of hexosamine. Biochem. J., 67, 52–60.

Frasca, P., Harper, R. and Katz, J. (1976) Isolation of single ostesons and osteons lamellae. Acta Anat., 95, 122–129.

Frasca, P., Harper, R. and Katz, J. (1977) Collagen fiber orientation in human secondary osteons. Acta Anat., 98, 1–13.

Frasca, P., Harper, R. and Katz, J. (1981) Strain and frequency dependence of shear storage modulus for human single osteons and cortical bone microsamples-size and hydration effects. J. Biomech, 14, 679–690.

Gebhardt, W., (1906) Ueber funktionell wichtige Anordnungsweisen der feineren und groberen Bauelemente des Wirbeltierknochens. II. Spezieller Teil. 1. Der Bau der Haverssohen Lamellensysteme und seine funktionelle Bedeutung. Arch. Entwickl. Mech Org., 20, 187–322.

Gebhardt, W., (1906) Ueber funktionell wichtige Anordnungsweisen der feineren und gr'beren Bauelemente des Wirbeltierknochens. II. Spezieller Teil. 1. Der Bau der Haverssohen Lamellensysteme und seine funktionelle Bedeutung. Arch. Entwickl. Mech Org., 20, 187.

Giraud-Guille, M. M. (1988) Twisted plywood architecture of collagen fibrils in human compact bone osteons. Calc. Tissue Int., 42, 167–180.

Gupta, V., and Bergstrm, J. S. (1998) Compressive failure of rocks by shear faulting. J. of Geoph. Res. 103, 23, 875–23,895.

Haut, R. C. (1983) Age-dependent influence of strain rate on the tensile failure of rat-tail tendon. Trans. ASME, 105, 296–299.

Herring, G. M. (1971) The organic matrix of bone. In: The Biochemistry and Physiology of Bone (G. H. Bourne ed.), Academic Press, New York, 128–190.

Hert, J., Fiala, P. and Petrtyl, M. (1994) Osteon orientation of the diaphysis of the long bones in man. Bone, 15, 269–277.

Hight, T. K. and Brandeau, J. F. (1983) Mathematical modeling of the stress strain-strain rate behavior of bone using the Ramberg-Osgood equation. J. Biomech., 16, 445–450.

Huja, S. S., Hasan, M. S., Pidaparti, R., Turner, C. H., Garetto, L. P. and Burr, D. (1999) Development of a fluorescent light technique for evaluating microdamage in done subjected to fatigue loading. J. Biomech., 32, 1243–1249.

Jepsen, K. J., Davy, D. T. and Krzypow, D. J. (1999) The role of the lamellar interface during torsional yielding of human cortical bone. J. Biomech., 32, 303–310.

Jones, R. M. (1975) Mechanics of Composite Materials. McGraw-Hill, New York.

Katz, J. L. and Meunier, A. (1987) The elastic anisotropy of bone. J. Biomech., 20, 1063–1070.

Katz, J. L. and Ukraincik, K. (1971) On the anisotropic elastic properties of hydroxyapatite. J. Biomech., 4, 221–227.

Kuo, T. Y., Skedros, J. G. and Bloebaum R. D. (1998) Comparison of human, primate, and canine femora: Implications for biomaterials testing in total hip replacement, J. Biomed. Mater. Res., 40, 475.

Lakes, R. S. (1995) On the torsional properties of single osteons, J. Biomech., 28, 1409–1410.

Lakes, R. S. and Katz, J. L. (1974) Interrelationships among the viscoelastic functions for anisotropic solids: application to calcified tissues and related systems. J. Biomech., 7, 259–270.

Lakes, R. S. and Katz, J. L. (1979b) Viscoelastic properties of wet cortical bone—II. Relaxation mechanisms. J. Biomech., 12, 679–687.

Lakes, R. S. and Katz, J. L. (1979c) Viscoelastic properties of wet cortical bone—III. A non-linear constitutive equation. J. Biomech., 12, 689–698.

Lakes, R. S., Katz, J. L. and Stemstein, S. S. (1979a) Viscoelastic properties of wet cortical bone—I. Torsional and biaxial studies. J. Biomech., 12, 657–678.

Leeson C. (1985) Textbook of Histology. Saunders, Philadelphia.

Levenston, M. E. and Carter, D. R. (1998) An energy dissipation-based model for damage stimulated bone adaptation. J. Biomech., 31, 579–584.

Lugassy, A. A. (1968) Mechanical and viscoelastic properties of bone and dentin in compression. Ph.D. Dissertation, Metallurgy and Materials Science, University of Pennsylvania.

Marotti, G. (1993) A new theory of bone lamellation. Calc. Tissue Int., 53, suppl. 1, S47–S56.

Marotti, G., Muglia, M. A., Palumbo, C., and Zoffe, D. (1994) The microscopic determinants of bone mechanical properties. Ital. J. Miner. Electr. Metab., 8, 167–175.

Martens, M., van Audekercke, R., de Meester, P. and Mulier, J. (1980) The mechanical characteristics of the long bones of the lower extremity in torsional loading. J. Biomech., 13, 667–676.

McElhaney, J. H. (1966) Dynamic response of bone and muscle tissue. J. of Appl. Physiol., 21, 1231–1236.

McElhaney, J. H. and Byars E. F. (1965) Dynamic response of biological materials. ASME, 65 WA/HUF 9.

Meunier, A. (1999) Personal communication.

Minns, R. J., Soden, P. D. and Jackson, D. S. (1973) The role of the fibrous components and ground substance on the mechanical properties of biological tissues: A preliminary investigation. J. Biomech., 6, 153.

Moro, L., Romanello, M., Favia, A., Lamanna, M. P. and Lozupone, E. (2000) Posttranslational Modifications of Bone Collagen Type I are Related to the Function of Rat Femoral Regions. Calc. Tissue Int., 66, 151–156.

Oguchi, M. and Oguchi, M. S. (1979) Tetraborate concentration on Morgan-Elson reaction and an improved method for hexosamine determination. Analic. Biochem., 98, 433–437.

Petersen, H. (1930) Die Organe des Skeletsystems. In: Handhuch dermikroskopischen Anatomie des Menshen (Mollendorff (v.), W. ed.), Springer, Berlin, 521–678.

Pidaparti, R. and Burr D. (1992) Collagen fiber orientation and geometry effects on the mechanical properties of secondary osteons. J. Biomech., 25, 869–880.

Piekarski, K. (1970) Fracture of bone. J. of Appl. Physics, 41, 215–223.

Portigliatti-Barbos, M., Bianco, P. and Ascenzi, A. (1983) Distribution of osteonic and interstitial components in the human femoral shaft with reference to structure, calcification, and mechanical properties. Acta Anat., 15, 178–186.

Portigliatti-Barbos, M., Bianco, P., Ascenzi, A. and Boyde, A. (1984) Collagen orientation in compact bone: II. Distribution of lamellae in the whole of the human femoral shaft with reference to its mechanical properties. Metab. Bone Dis. & Rel. Res., 5, 309–315.

Portigliatti-Barbos, M., Carando, S., Ascenzi, A. and Boyde, A. (1987) On the structural symmetry of human femurs, Bone, 8, 165–169.

Pugliarello, M. C., Vittur, F., de Bernard, B., Bonucci, E. and Ascenzi, A. (1970) Chemical modifications in osteones during calcification. Calc. Tissue Res., 5, 108–114.

Ranvier, L. (1887) Traitè Technique d'Histologie, F. Savy, Paris.

Rauber, A. (1873) Elasticitat and Festigkeit der Knochen. Leipzig, Wilhelm Engelmann.

Rho, J. Y. (2000) Ultrasonic methods for evaluating mechanical properties of bone. In: Mechanical testing of bone (An Y. and Draughn R. eds), CRC Press, Boca Raton, Fla., 357–370.

Rho, J. Y., Zioupos, P., Currey, J. D., and Pharr, G. M. (1999) Variations in the individual thick lamellar properties within osteons by nanoindentation, Bone, 25, 295–300.

Rouillier C.-H., Huber, L., Kellenberger, E.-D. and Rutishauser, E. (1952) La structure lamellaire de l'ostèone. Acta Anat., 14, 19.

Rouillier, C.-H. (1956) Collagen fibers of connective tissue. In: The Biochemistry and Physiology of Bone (G. H. Bourne, ed), 107–147, Academic Press, London/New York.

Ruth, E. B. (1947) Bone studies. 1. Fibrillar structure of adult human bone. Amer. J. Anat., 80, 35.

Sammarco, G., Burstein, A., Davis, W. and Frankel, V. (1971) The biomechanics of torsional fractures; the effect of loading rate on ultimate properties. J. Biomech., 4, 113–117.

Sasaki, N and Yoshikawa, M. (1993) Stress relaxation in native and EDTA-treated bone as a function of mineral content. J. Biomech., 26, 77–83.

Sasaki, N. (2000) Viscoelastic properties of bone and testing methods. In: Mechanical testing of bone (An Y. and Draughn R. eds), CRC Press, Boca Raton, Fla., 329–348.

Serafini-Cessi, F. and Cessi, C. (1965) The estimation of hydroxyproline in protein hydrolysates. In: Structure and Fuction of Connective and Skeletal Tissue (Fitton-Jackson et al. eds), Butterworks, London, 222–223.

Simkin, A. and Robin, G. (1974) Fracture formation in differing collagen fiber pattern of compact bone. J. Biomech., 7, 183–188.

Smith, R. and Keiper, D. (1965) Dynamic measurement of viscoelastic properties of bone. Am. J. Med. Elec., 4, 156–160.

Spears, I. R., Pfleiderer, M., Schneider, E., Hille, E. and Morlock, M. M. (2001) The effect of interfacial parameters on cup-bone relative micromotions. A finite element investigation. J. Biomech., 34, 113–120.

Teerlink, T., Tavanier, P. and Netelenbos, J. C. (1989) Selective determination of Hydroxyproline in urine by high-performance liquid chromatography using precolumn derivatization. Clin. Chim. Acta, 183,309–316.

Timoshenko, S., and Young, D. H. (1962) Elements of Strength of Materials. Van Nostrand, Princeton.

Vincentelli, R. and Evans, F. G. (1971) Relations among mechanical properties, collagen fibers, and calcification in adult human cortical bone. J. Biomech., 4, 193–201.

What is claimed is:

1. A system for modeling macrostructural characteristics of a bone comprising:
    a first hierarchical order comprising at least one macroscopic region of the bone,
    a second hierarchical order comprising at least one empirically-derived non-homogeneous second order component representing one or more osteons, trabeculae, or lamellae within the macroscopic region, and
    a viscoelastic property correlated with at least one second order component, and
    wherein the second order components are used to determine properties of the first hierarchical order region, and
    wherein a property of the first hierarchical order region is determined based on the viscoelastic property of the second order component.

2. A system of claim 1, wherein the osteon is an extinct osteon or an alternate osteon.

3. A system of claim 1, wherein the viscoelastic property comprises at least one parameter selected from the group consisting of collagen content, mucopolysaceharide content, hydroxyapatite content, osteocyte content, osteoblast content, and content of porosity fluids.

4. A system of claim 1, wherein the viscoelastic property is selected from the group consisting of an angle-of-twist as a function of torque, osteon hydroxyapatite content, strain rate, and time.

5. A system of claim 4, wherein the angle-of-twist as a function of torque is derived from tests conducted under monotonic or dynamic loading.

6. A system of claim 4, wherein angle-of-twist as a function of torque at an approximately constant strain rate and approximately constant hydroxyapatite content is represented by a Ramgood-Osgood equation.

7. A system of claim 6, wherein a higher hydroxyapatite content leads to a higher angle-of-twist as a function of torque.

8. A system of claim 6, wherein a higher strain rate leads to a higher angle-of-twist as a function of torque.

9. A system of claim 1, comprising the viscoelastic properties of extinct and alternate osteons.

10. A system of claim 9, further comprising a third hierarchical order comprising at least one third order component representing one or more collagen bundles, hydroxyapatite crystallites, mucopolysaceharides, or combinations thereof within one or more regions of the second order components, wherein the third order components are used to construct the second order components;

wherein the viscoelastic properties comprise at least one parameter selected from the group consisting of collagen content, mucopolysaceharide content, and hydroxyapatite content.

11. A system of claim 10, wherein the ratio of collagen and mucopolysaccharides in extinct osteons as compared to collagen and mucopolysaccharides in alternate osteons is less than 1 for extinct and alternate osteons with approximately equal hydroxyapatite contents.

12. A system of claim 10, wherein a relative amount of the third order components depends on degree of calcification of the second order components.

13. A system of claim 12, wherein the degree of calcification of the second order components is assigned based on experimental determinations.

14. A system as in claim 9, wherein each subject bone is divided into a plurality of samples from corresponding locations of each subject bone;
one or more viscoelastic properties of at least one second order component of each sample is evaluated; and
the evaluations are aggregated to determine the viscoelastic properties of the second order components.

15. A system of claim 1, wherein at least one of the osteons has an internal diameter of less than or equal to 40 μm, an external diameter of less than or equal to 210 μm, and a height of less than or equal to 500 μm.

16. A system of claim 15, wherein at least one of the osteons is an extinct osteon comprising at least 12 laminae.

17. A system of claim 15, wherein at least one of the osteons is an alternate osteon comprising at least 36 laminae.

18. A system of claim 1, comprising a Finite Element Model (FEM).

19. A system as in claim 1, wherein the viscoelastic properties of the second order components are assigned based on a plurality of experimental determinations.

20. A system as in claim 1, wherein the aggregated evaluations are collected in a database of viscoelastic properties for the subject bone of the specified type.

21. A method of producing a model of bone, comprising the steps of:
a) specifying a first hierarchical order macroscopic region of a selected bone;
b) dividing the macroscopic region into a finite number of elements of second hierarchical order, each element representing an empirically-derived non-homogeneous second order component comprising one or more osteons, trabeculae, or lamellae;
c) assigning a viscoelastic property to at least one second order component and
d) determining a property of the first hierarchical order macroscopic region of the selected bone based on the viscoelastic property of the second order components.

22. The method of claim 21, wherein the model simulates fracture propagation by:
calculating a stress distribution as a function of a torque applied to the bone;
calculating a strain distribution based on the stress distribution; and
comparing strain in the strain distribution to a maximum strain,
wherein fracture occurs when the strain exceeds the maximum strain.

23. A method of claim 21, comprising the step of determining viscoelastic properties of alternate and extinct osteons.

24. The method of claim 23, comprising the step of dividing each second order component into a finite number of elements, each element representing one or more collagen bundles, hydroxyapatite crystallites, mucopolysaceharides, or combinations thereof;
wherein the viscoelastic properties comprise at least one parameter selected from the group consisting of collagen content, mucopolysaceharide content, and hydroxyapatite content.

25. The method of claim 24, wherein the viscoelastic properties are determined by evaluating at least one parameter selected from the group consisting of angle-of-twist as a function of torque, osteon hydroxyapatite content, strain rate, or time.

26. A method of claim 24, wherein a relative amount of the collagen bundles, hydroxyapatite crystallites, and mucopolysaccharides depends on degree of calcification of the second order components.

27. A method of claim 26, wherein the degree of calcification of the second order components is assigned based on experimental determinations.

28. A method of claim 21, wherein the viscoelastic properties of the second order components are assigned based on a plurality of experimental determinations.

29. A method of claim 28, wherein the experimental determinations comprise the steps of:
selecting a plurality of subject bones of a specified type;
dividing each of the subject bones into a plurality of samples, wherein each sample corresponds to a location within the specified macroscopic region of each subject bone;
evaluating one or more viscoelastic properties of at least one second order component of each sample; and
aggregating the evaluations.

30. A method of claim 29, wherein the experimental determination further comprises the steps of:
repeating the experimental determination steps for subject bones of different types; and
compiling a database of representative viscoelastic properties of each type of subject bone based on the aggregated evaluations.

31. The method of claim 29, wherein the viscoelastic properties comprise angle-of-twist as a function of torque and the experimental determinations further comprise:
applying quasi-static torsional loading to rupture each of the samples;
collecting data on torque and angle-of-twist of each of the samples;
determining a torque vs. angle-of-twist curve for each of the samples based on the collected data; and
determining the angle-of-twist as a function of torque of the second order components of the selected bone based on the torque vs. angle-of-twist curve of the samples.

32. The method of claim 29, wherein the samples comprise a plurality of alternate and extinct osteons, and the method further comprises the steps of:
determining the ratio of collagen and mucopolysaccharides in an extinct osteon of the selected bone as compared to those of an alternate osteon of the selected bone by the following method:
(i) drying the extinct and alternate osteon samples to constant weight;
(ii) separately contacting the extinct and alternate osteon samples with acid to promote the hydrolysis of collagen to hydroxyproline and mucopolysaccharides to hexosamine;
(iii) separating hydroxyproline from hexosamine; and
(iv) determining the ratio of hydroxyproline and hexosamine in the extinct osteon samples as compared to the alternate osteon samples;
wherein the ratio of hydroxyproline and hexosamine in the extinct osteon samples as compared to the alternate osteon samples corresponds to the ratio of collagen and mucopolysaccharides in the extinct osteon of the selected bone as compared to the alternate osteon of the selected bone.

33. The method of claim 32, wherein the ratio of collagen and mucopolysaccharides in a extinct osteon of the selected bone as compared to an alternate osteon of the selected bone is less than 1 for a extinct and alternate osteon with approximately equal hydroxyapatite contents.

34. The method of claim 29, wherein the viscoelastic property of the second order components is modified based on collagen-bundle directions of the selected bone, the method further comprising the step of:
determining collagen-bundle directions of the samples using circularly polarizing light microscopy, confocal microscopy or X-ray diffraction of the samples.

35. A method of producing a model of a bone comprising the steps of:

a) specifying a first hierarchical order macroscopic region of a selected bone;
b) dividing the macroscopic region into a finite number of elements of second hierarchical order, each element representing an empirically-derived non-homogeneous second order component comprising one or more alternate and extinct osteons;
c) assigning a viscoelastic property to at least one second order component, wherein the viscoelastic property comprises at least one parameter selected from the group consisting of collagen content, mucopolysaccharide content, hydroxyapatite content, osteocyte content, osteoblast content, and content of porosity fluids; and
d) determining a viscoelastic property of the first hierarchical order macroscopic region of the selected bone based on the viscoelastic properties of the second order components.

36. The method of claim 35, wherein the viscoelastic property of the second order components is modified based on collagen-bundle directions of the selected bone, the method further comprising the step of:
determining collagen-bundle directions of the samples using circularly polarizing light microscopy, confocal microscopy or X-ray diffraction of the samples.

37. A method of claim 35, wherein the viscoelastic properties of the second order components are assigned based on a plurality of experimental determinations.

* * * * *

UNITED STATES PATENT AND TRADEMARK OFFICE
CERTIFICATE OF CORRECTION

| | | |
|---|---|---|
| PATENT NO. | : 7,127,383 B2 | |
| APPLICATION NO. | : 10/066293 | |
| DATED | : October 24, 2006 | |
| INVENTOR(S) | : Maria-Grazia Ascenzi and John Michael Kabo | |

It is certified that error appears in the above-identified patent and that said Letters Patent is hereby corrected as shown below:

Amendments to the Specification:

Please replace the paragraph at col. 4, lines 43-49 with the following amended paragraph:

FIG. 2. Schematic drawing of torsional loading device used in the Examples. 1=Rotational axis with its jaws; 2[[;]] and 3=hard metal wedges of the pendulum loading system; 4=the wheel around which the thread, lodged with weights, is attached; 5=the axis of the pendulum; 6=the mirror that reflects the laser beam onto the graduated scale to detect angle-of-twist variations (from Ascenzi, A. Baschieri, P. Benvenuti, A. (1994) The torsional properties of single selected osteons. J. Biomechanics, 27(7): 875-884).

Please replace the paragraph at col. 4, lines 50-51 with the following amended paragraph:

FIG. 3. Diagram showing the trapezoid cut from a thin transverse femoral section around a chosen alternate osteon (from Ascenzi, M.-G, Ascenzi, A., Burghammer, M., Panzavolta, S., Benvenuti, A. and Bigi, A. (2003) Structural differences between "dark" and "bright" isolated human osteonic lamellea. J. Structural Biology, 141, 22-33).

UNITED STATES PATENT AND TRADEMARK OFFICE
CERTIFICATE OF CORRECTION

PATENT NO. : 7,127,383 B2
APPLICATION NO. : 10/066293
DATED : October 24, 2006
INVENTOR(S) : Maria-Grazia Ascenzi and John Michael Kabo It is certified that error appears in the above-identified patent and that said Letters Patent is hereby corrected as shown below:

Please replace the paragraph at col. 4, lines 58-67 with the following amended paragraph:

FIGS. 6A and 6B. (A) Material model consisting of fiber-reinforced unidirectional laminae. The first few external laminae are partially pulled out to show arrangement. (B) On a small laminar element of constant thickness, the principal material axes are labeled 1, 2, and 3. Direction 1 is parallel, and direction 2 perpendicular, to the fibers. Direction 3 is the radial direction, perpendicular to the plane of the diagram. Circumferential and axial directions are labeled Θ and z. The angle between the circumferential direction and direction 1 is denoted ~~γ~~ Y (from Ascenzi, M.-G. (1999) first estimation of prestress in so-called circularly fibered osteonic lamellae, J. Biomechanics, (32): 935-942).

Signed and Sealed this

Tenth Day of July, 2007

JON W. DUDAS
*Director of the United States Patent and Trademark Office*